US008676802B2

(12) United States Patent
Zelevinsky et al.

(10) Patent No.: US 8,676,802 B2
(45) Date of Patent: Mar. 18, 2014

(54) METHOD AND SYSTEM FOR INFORMATION RETRIEVAL WITH CLUSTERING

(75) Inventors: Vladimir V. Zelevinsky, Brookline, MA (US); Daniel Tunkelang, Brooklyn, NY (US); Frederick C. Knabe, Boston, MA (US); Michael Y. Saji, Cambridge, MA (US); Velin Krassimirov Tzanov, Jersey City, NJ (US)

(73) Assignee: Oracle OTC Subsidiary LLC, Redwood Shores, CA (US)

( * ) Notice: Subject to any disclaimer, the term of this patent is extended or adjusted under 35 U.S.C. 154(b) by 74 days.

(21) Appl. No.: 11/606,469

(22) Filed: Nov. 30, 2006

(65) Prior Publication Data

US 2008/0133479 A1 Jun. 5, 2008

(51) Int. Cl.
*G06F 7/00* (2006.01)
*G06F 17/30* (2006.01)

(52) U.S. Cl.
USPC ............................ 707/737; 707/736; 707/705

(58) Field of Classification Search
None
See application file for complete search history.

(56) References Cited

U.S. PATENT DOCUMENTS

| | | | |
|---|---|---|---|
| 4,775,935 A | 10/1988 | Yourick | |
| 4,868,733 A | 9/1989 | Fujisawa et al. | |
| 4,879,648 A | 11/1989 | Cochran et al. | |
| 4,996,642 A | 2/1991 | Hey | |
| 5,206,949 A | 4/1993 | Cochran et al. | |
| 5,241,671 A | 8/1993 | Reed et al. | |
| 5,418,717 A | 5/1995 | Su et al. | |
| 5,418,948 A | 5/1995 | Turtle | |
| 5,418,951 A | 5/1995 | Damashek | |
| 5,440,742 A | 8/1995 | Schwanke | |
| 5,485,621 A | 1/1996 | Schwanke | |
| 5,544,049 A | 8/1996 | Henderson et al. | |
| 5,546,576 A | 8/1996 | Cochrane et al. | |
| 5,548,506 A | 8/1996 | Srinivasan | |
| 5,590,269 A | 12/1996 | Kruse et al. | |

(Continued)

FOREIGN PATENT DOCUMENTS

| | | |
|---|---|---|
| EP | 0196064 | 10/1986 |
| EP | 0597630 | 5/1994 |

(Continued)

OTHER PUBLICATIONS

George Koch and Kevin Loney, ORACLE8 the complete Reference, 1997, Osborne McGraw-Hill, p. 68.*

(Continued)

*Primary Examiner* — Fred I Ehichioya
*Assistant Examiner* — Thomas Meng
(74) *Attorney, Agent, or Firm* — Miles & Stockbridge P.C.

(57) ABSTRACT

Methods and systems that enable searching with clustering in information access systems are described. The methods of clustering operate on a collection of materials wherein each item in the collection may be associated with one or more properties. An original subset of materials is selected from the collection and relevant properties associated with the subset of materials are clustered into property clusters. Each property cluster generally contains properties that are more similar to each other than to properties in a different property cluster. The property clusters can be used to respond to the query. A mapping function can be used to identify a set of materials that correspond to each property cluster based on the associations between individual items and properties. The property clusters can also be used for iterative query refinement.

33 Claims, 11 Drawing Sheets

(56) References Cited

U.S. PATENT DOCUMENTS

| | | | |
|---|---|---|---|
| 5,600,829 A | 2/1997 | Tsatalos et al. |
| 5,630,125 A | 5/1997 | Zellweger |
| 5,634,128 A | 5/1997 | Messina |
| 5,644,740 A | 7/1997 | Kiuchi |
| 5,671,404 A | 9/1997 | Lizee et al. |
| 5,675,784 A | 10/1997 | Maxwell et al. |
| 5,696,916 A | 12/1997 | Yamazaki et al. |
| 5,706,497 A | 1/1998 | Takahashi et al. |
| 5,715,444 A | 2/1998 | Danish et al. |
| 5,724,571 A | 3/1998 | Woods |
| 5,740,425 A | 4/1998 | Povilus |
| 5,749,081 A | 5/1998 | Whiteis |
| 5,764,975 A | 6/1998 | Taniguchi et al. |
| 5,768,578 A | 6/1998 | Kirk et al. |
| 5,768,581 A | 6/1998 | Cochran |
| 5,787,422 A | 7/1998 | Tukey et al. |
| 5,812,998 A | 9/1998 | Tsutsumi et al. |
| 5,819,273 A | 10/1998 | Vora et al. |
| 5,835,905 A | 11/1998 | Pirolli et al. |
| 5,852,822 A | 12/1998 | Srinivasan et al. |
| 5,864,845 A | 1/1999 | Voorhees et al. |
| 5,864,846 A | 1/1999 | Voorhees et al. |
| 5,864,863 A | 1/1999 | Burrows |
| 5,870,746 A | 2/1999 | Knutson et al. |
| 5,873,075 A | 2/1999 | Cochrane et al. |
| 5,875,440 A | 2/1999 | Cooperman et al. |
| 5,875,446 A | 2/1999 | Brown et al. |
| 5,878,423 A | 3/1999 | Anderson et al. |
| 5,893,104 A | 4/1999 | Srinivasan et al. |
| 5,895,470 A | 4/1999 | Pirolli et al. |
| 5,897,639 A | 4/1999 | Greef et al. |
| 5,920,859 A | 7/1999 | Li |
| 5,924,105 A | 7/1999 | Punch, III et al. |
| 5,926,811 A | 7/1999 | Miller et al. |
| 5,940,821 A | 8/1999 | Wical |
| 5,943,670 A | 8/1999 | Prager |
| 5,950,189 A | 9/1999 | Cohen et al. |
| 5,970,489 A | 10/1999 | Jacobson et al. |
| 5,978,788 A | 11/1999 | Castelli et al. |
| 5,978,794 A | 11/1999 | Agrawal et al. |
| 5,978,799 A | 11/1999 | Hirsch et al. |
| 5,983,219 A | 11/1999 | Danish et al. |
| 5,983,220 A | 11/1999 | Schmitt |
| 5,983,223 A | 11/1999 | Perlman |
| 5,986,655 A | 11/1999 | Chiu et al. |
| 5,987,468 A | 11/1999 | Singh et al. |
| 5,987,470 A | 11/1999 | Meyers et al. |
| 5,991,751 A | 11/1999 | Rivette et al. |
| 5,991,756 A | 11/1999 | Wu |
| 5,995,978 A * | 11/1999 | Cullen et al. ........... 707/999.003 |
| 6,006,217 A | 12/1999 | Lumsden |
| 6,006,218 A | 12/1999 | Breese et al. |
| 6,006,222 A | 12/1999 | Culliss |
| 6,006,225 A | 12/1999 | Bowman et al. |
| 6,009,424 A | 12/1999 | Lepage et al. |
| 6,012,006 A | 1/2000 | Ohneda et al. |
| 6,012,066 A | 1/2000 | Discount et al. |
| 6,014,639 A | 1/2000 | Fohn et al. |
| 6,014,655 A | 1/2000 | Fujiwara et al. |
| 6,014,657 A | 1/2000 | Weida et al. |
| 6,014,665 A | 1/2000 | Culliss |
| 6,028,605 A | 2/2000 | Conrad et al. |
| 6,029,195 A | 2/2000 | Herz |
| 6,035,294 A | 3/2000 | Fish |
| 6,038,560 A | 3/2000 | Wical |
| 6,038,574 A | 3/2000 | Pitkow et al. |
| 6,049,797 A | 4/2000 | Guha et al. |
| 6,070,162 A | 5/2000 | Miyasaka et al. |
| 6,092,049 A | 7/2000 | Chislenko et al. |
| 6,094,650 A | 7/2000 | Stoffel et al. |
| 6,112,186 A | 8/2000 | Bergh et al. |
| 6,144,958 A | 11/2000 | Ortega et al. |
| 6,167,368 A | 12/2000 | Wacholder |
| 6,167,397 A | 12/2000 | Jacobson et al. |
| 6,212,517 B1 * | 4/2001 | Sato et al. ..................... 707/5 |
| 6,226,745 B1 | 5/2001 | Wiederhold |
| 6,233,575 B1 | 5/2001 | Agrawal |
| 6,236,985 B1 | 5/2001 | Aggarwal et al. |
| 6,236,987 B1 | 5/2001 | Horowitz et al. |
| 6,240,378 B1 | 5/2001 | Imanaka et al. |
| 6,240,409 B1 | 5/2001 | Aiken |
| 6,243,713 B1 | 6/2001 | Nelson et al. |
| 6,260,008 B1 | 7/2001 | Sanfilippo |
| 6,263,334 B1 | 7/2001 | Fayyad et al. |
| 6,266,199 B1 | 7/2001 | Gillis et al. |
| 6,266,649 B1 | 7/2001 | Linden et al. |
| 6,269,368 B1 | 7/2001 | Diamond |
| 6,272,507 B1 | 8/2001 | Pirolli et al. |
| 6,289,354 B1 | 9/2001 | Aggarwal et al. |
| 6,301,577 B1 | 10/2001 | Matsumoto et al. |
| 6,317,741 B1 | 11/2001 | Burrows |
| 6,339,767 B1 | 1/2002 | Rivette et al. |
| 6,345,273 B1 | 2/2002 | Cochran |
| 6,356,899 B1 | 3/2002 | Chakrabarti et al. |
| 6,360,227 B1 | 3/2002 | Aggarwal et al. |
| 6,360,277 B1 | 3/2002 | Ruckley et al. |
| 6,363,377 B1 | 3/2002 | Kravets et al. |
| 6,385,602 B1 * | 5/2002 | Tso et al. ............... 707/999.003 |
| 6,397,221 B1 | 5/2002 | Greef et al. |
| 6,418,429 B1 | 7/2002 | Borovoy et al. |
| 6,424,971 B1 | 7/2002 | Kreulen et al. |
| 6,424,983 B1 | 7/2002 | Schabes et al. |
| 6,429,984 B1 | 8/2002 | Alex |
| 6,446,068 B1 | 9/2002 | Kortge |
| 6,453,315 B1 | 9/2002 | Weissman et al. |
| 6,460,034 B1 | 10/2002 | Wical |
| 6,466,918 B1 | 10/2002 | Spiegel et al. |
| 6,480,843 B2 | 11/2002 | Li |
| 6,483,523 B1 | 11/2002 | Feng |
| 6,490,111 B1 | 12/2002 | Sacks |
| 6,505,197 B1 | 1/2003 | Sundaresan et al. |
| 6,507,840 B1 | 1/2003 | Ioanndis |
| 6,519,618 B1 | 2/2003 | Snyder |
| 6,539,376 B1 | 3/2003 | Sundaresan et al. |
| 6,553,367 B2 | 4/2003 | Horovitz et al. |
| 6,560,597 B1 | 5/2003 | Dhillon et al. |
| 6,563,521 B1 | 5/2003 | Perttunen |
| 6,571,282 B1 | 5/2003 | Bowman-Amuah |
| 6,606,619 B2 | 8/2003 | Ortega et al. |
| 6,611,825 B1 | 8/2003 | Billheimer et al. |
| 6,618,697 B1 | 9/2003 | Kantrowitz et al. |
| 6,628,466 B2 | 9/2003 | Alex |
| 6,633,316 B1 | 10/2003 | Maddalozzo, Jr. et al. |
| 6,633,860 B1 | 10/2003 | Afek et al. |
| 6,633,868 B1 | 10/2003 | Min et al. |
| 6,642,940 B1 | 11/2003 | Dakss |
| 6,647,391 B1 | 11/2003 | Smith et al. |
| 6,651,057 B1 | 11/2003 | Jin |
| 6,651,058 B1 | 11/2003 | Sundaresan et al. |
| 6,654,739 B1 * | 11/2003 | Apte et al. ............. 707/999.005 |
| 6,697,801 B1 | 2/2004 | Eldredge et al. |
| 6,697,998 B1 | 2/2004 | Damerau et al. |
| 6,701,311 B2 | 3/2004 | Biebesheimer et al. |
| 6,704,725 B1 | 3/2004 | Lee |
| 6,711,585 B1 | 3/2004 | Copperman et al. |
| 6,735,578 B2 | 5/2004 | Shetty et al. |
| 6,748,371 B1 | 6/2004 | Levanoni et al. |
| 6,763,349 B1 | 7/2004 | Sacco |
| 6,763,351 B1 | 7/2004 | Subramaniam et al. |
| 6,778,995 B1 | 8/2004 | Gallivan |
| 6,845,354 B1 | 1/2005 | Kuo et al. |
| 6,853,982 B2 | 2/2005 | Smith et al. |
| 6,868,411 B2 | 3/2005 | Shanahan |
| 6,928,434 B1 | 8/2005 | Choi et al. |
| 6,947,930 B2 | 9/2005 | Anick et al. |
| 6,978,274 B1 | 12/2005 | Gallivan et al. |
| 7,035,864 B1 | 4/2006 | Ferrari et al. |
| 7,062,483 B2 | 6/2006 | Ferrari et al. |
| 7,072,902 B2 | 7/2006 | Kleinberger et al. |
| 7,085,771 B2 | 8/2006 | Chung et al. |
| 7,092,936 B1 | 8/2006 | Alonso et al. |
| 7,093,200 B2 | 8/2006 | Schreiber et al. |
| 7,099,885 B2 | 8/2006 | Hellman et al. |
| 7,149,732 B2 | 12/2006 | Wen et al. |

(56) References Cited

U.S. PATENT DOCUMENTS

| | | | |
|---|---|---|---|
| 7,152,064 B2* | 12/2006 | Bourdoncle et al. | 707/999.005 |
| 7,325,201 B2 | 1/2008 | Ferrari | |
| 7,366,721 B1 | 4/2008 | Bennett et al. | |
| 7,389,241 B1 | 6/2008 | Bascom | |
| 7,428,528 B1 | 9/2008 | Ferrari | |
| 7,567,957 B2 | 7/2009 | Ferrari | |
| 7,596,581 B2 | 9/2009 | Frank | |
| 7,617,184 B2 | 11/2009 | Ferrari | |
| 7,788,274 B1 | 8/2010 | Ionescu | |
| 7,856,434 B2 | 12/2010 | Gluzman Peregrine | |
| 7,912,823 B2 | 3/2011 | Ferrari | |
| 2001/0044758 A1 | 11/2001 | Talib et al. | |
| 2001/0044837 A1 | 11/2001 | Talib et al. | |
| 2001/0047353 A1 | 11/2001 | Talib et al. | |
| 2001/0049674 A1 | 12/2001 | Talib et al. | |
| 2001/0049677 A1 | 12/2001 | Talib et al. | |
| 2002/0051020 A1 | 5/2002 | Ferrari et al. | |
| 2002/0065857 A1 | 5/2002 | Michalewicz et al. | |
| 2002/0083039 A1 | 6/2002 | Ferrari et al. | |
| 2002/0091696 A1 | 7/2002 | Craft et al. | |
| 2002/0095405 A1 | 7/2002 | Fujiwara | |
| 2002/0099675 A1 | 7/2002 | Agrafiotis et al. | |
| 2002/0147703 A1 | 10/2002 | Yu et al. | |
| 2002/0152204 A1 | 10/2002 | Ortega et al. | |
| 2003/0068097 A1 | 4/2003 | Wilson | |
| 2003/0078686 A1 | 4/2003 | Ma et al. | |
| 2003/0093411 A1 | 5/2003 | Minor | |
| 2003/0101187 A1 | 5/2003 | Gaussier et al. | |
| 2003/0110181 A1 | 6/2003 | Schuetze et al. | |
| 2003/0115191 A1* | 6/2003 | Copperman et al. | 707/3 |
| 2003/0120630 A1 | 6/2003 | Tunkelang | |
| 2003/0217335 A1* | 11/2003 | Chung et al. | 707/1 |
| 2004/0006736 A1 | 1/2004 | Kawatani | |
| 2004/0117366 A1 | 6/2004 | Ferrari et al. | |
| 2004/0139059 A1* | 7/2004 | Conroy et al. | 707/3 |
| 2004/0205448 A1 | 10/2004 | Grefenstette et al. | |
| 2004/0220907 A1 | 11/2004 | Carmarillo | |
| 2004/0243554 A1 | 12/2004 | Broder et al. | |
| 2004/0243557 A1 | 12/2004 | Broder et al. | |
| 2005/0022114 A1 | 1/2005 | Shanahan et al. | |
| 2005/0044487 A1 | 2/2005 | Bellegarda | |
| 2005/0097088 A1 | 5/2005 | Bennett et al. | |
| 2005/0108212 A1 | 5/2005 | Karimisetty et al. | |
| 2005/0165780 A1* | 7/2005 | Omega et al. | 707/7 |
| 2005/0210042 A1* | 9/2005 | Goedken | 707/100 |
| 2006/0026152 A1 | 2/2006 | Zeng | |
| 2006/0031215 A1 | 2/2006 | Pong Robert | |
| 2006/0224581 A1* | 10/2006 | Sasai | 707/5 |
| 2006/0242139 A1 | 10/2006 | Butterfield | |
| 2006/0248074 A1 | 11/2006 | Carmel | |
| 2007/0011151 A1* | 1/2007 | Hagar et al. | 707/4 |
| 2007/0106658 A1 | 5/2007 | Ferrari | |
| 2007/0214131 A1 | 9/2007 | Cucerzan | |
| 2007/0294225 A1 | 12/2007 | Radlinski et al. | |
| 2008/0005118 A1* | 1/2008 | Shakib et al. | 707/10 |
| 2008/0104032 A1 | 5/2008 | Sarkar | |
| 2008/0154878 A1 | 6/2008 | Rose et al. | |
| 2009/0006382 A1 | 1/2009 | Tunkelang | |
| 2009/0006383 A1 | 1/2009 | Tunkelang | |
| 2009/0006384 A1 | 1/2009 | Tunkelang | |
| 2009/0006385 A1 | 1/2009 | Tunkelang | |
| 2009/0006386 A1 | 1/2009 | Tunkelang | |
| 2009/0006387 A1 | 1/2009 | Tunkelang | |
| 2009/0006438 A1 | 1/2009 | Tunkelang | |

FOREIGN PATENT DOCUMENTS

| | | |
|---|---|---|
| EP | 0676705 | 10/1995 |
| EP | 0694829 A1 | 1/1996 |
| EP | 0795833 | 9/1997 |
| EP | 0827063 | 3/1998 |
| EP | 0918295 | 5/1999 |
| EP | 1050830 | 11/2000 |
| EP | 0 694 829 B1 | 5/2002 |
| GB | 2293667 | 4/1996 |
| GB | 2297179 | 7/1996 |
| JP | 09034901 | 2/1997 |
| JP | 10134063 | 5/1998 |
| JP | 11250107 | 9/1999 |
| JP | 11296547 | 10/1999 |
| WO | WO-90/04231 | 4/1990 |
| WO | WO-96/27161 | 9/1996 |
| WO | WO-97/36251 | 10/1997 |
| WO | WO-98/20436 | 5/1998 |
| WO | WO-00/36529 | 6/2000 |
| WO | WO00/423533 | 7/2000 |
| WO | WO-01/67225 | 9/2001 |
| WO | WO-01/67300 | 9/2001 |
| WO | WO-02/097671 A2 | 12/2002 |
| WO | WO-03/027902 | 4/2003 |

OTHER PUBLICATIONS

Carey, M. et al., "Info Navigator: A Visualization Tool for Document Searching and Browsing", Proceedings International Conference Distributed Multmedia Systems, pp. 23-28, (DMS Sep. 2003), 2003.

Cilibrasi, R. et al., "Automatic Meaning Discovery Using Google", 31 Pages, www.bsik-bricks.nl/events/ab/google_abstract.shtml, www.arxiv.org/abs/cs.CL0412098, (2004).

George Koch and Kevin Loney, "Oracle 8, the Complete Reference," Osborne McGrawHill, p. 68 (1997).

International Search Report and Written Opinion for International Patent Application No. PCt/US07/86150, mailed Jul. 23, 2008.

Agosti, M., et al. "Issues of Data Modelling in Information Retrieval" Electronic Publishing, (1991), vol. 4(4) pp. 219-237.

Allen, R.B., "Retrieval From Facet Spaces" Electronic Publishing (1995), vol. 8(2&3), pp. 247-257.

Allen, R.B., "Two Digital Library Interfaces That Exploit Hierarchical Structure" Electronic Publishing (1995) 8 pages.

Amato, et al., "Region proximity in metric spaces and its use for approximate similarity search", ACM Trans. In. System, (2003), vol. 21(2), pp. 192-227.

Baeza-Yates, et al., "New Approaches to Information Management: Attribute-Centric Data Systems" Proceedings Seventh International Symposium on String Processing and Information Retrieval, (2000), pp. 17-27.

Beaudoin et al., "Cheops: A Compact Explorer for Complex Hierarchies", IEEE, pp. 87-92 (1996).

Bergstrom, "A family of delphi components for case-based reasoning", Proceedings 11th IEEE International Conference on Chicago, (1999), pp. 153-160.

Beyer et al., "When is 'Nearest Neighbor' meaningful", Proceedings of the 7th International Conference on Database Theory, (1999).

Bird et al., "Content-Driven Navigation of Large Databases", The Institution of Electrical Engineers, 1996, pp. 13/1-13/5.

Chen et al., "Internet Browsing and Searching: User Evaluations of Category Map and Concept Space Techniques", Wiley InterScience: Journal:Abstract, Jan. 6, 1999.

Chen et al., "Internet Browsing and Searching: User Evaluations of Category Map and Concept Space Techniques," Journal of the American Society for Information Science, vol. 49, pp. 582-603 (1998).

Chen et al., "Object Signatures for Supporting Efficient Navigation in Object-Oriented Databases", Proceeding of the 32nd Hawaii International Conference on System Sciences, IEEE, pp. 502-507 (1997).

Chen et al., "Online Query Refinement on Information Retrieval Systems""A Process Model of Searcher/System Interactions", MID Department, University of Arizona, pp. 115-133 (1990).

Diamantini et al., "A conceptual indexing method for content-based retrieval", Database and Expert Systems Applications. Proceedings Tenth Workshop on Florence Italy, (1999), pp. 192-197.

Fua et al., "Structure-Based Brushes: A Mechanism for Navigating Hierarchically Organized Data and Information Spaces", *IEEE Tranactions on Visualization and Computer Graphics*, vol. 6, No. 2, pp. 150-159, Apr.-Jun. 2000.

Garcia-Molina et al., "The Query Compiler" Database System Implementation, 2000, Prentice Hall, Upper Saddle River, NJ, USA, XP002423997, pp. 329-364.

(56) References Cited

OTHER PUBLICATIONS

Gil et al., "A Visual Interface and Navigator for the P/FDM Object Database", Department of Computing Science, University of Aberdeen, IEEE, pp. 54-63 (1999).
Guha et al., "ROCK: A robust clustering algorithm for categorical attributes", Data Engineering Proceedings 15th International Conference on Sidney, (1999), pp. 512-521.
Guttman, "R-Trees: A dynamic index structure for spatial searching", Proceedings of the ACM SIG-MOD Conference, (1984).
Han et al., "Join Index Hierarchy: An Indexing Structure for Efficient Navigation in Object-Oriented Databases", *IEEE Transactions on Knowledge and Data Engineering*, vol. 11, No. 2, pp. 321-337, Mar./Apr. 1999.
Han-Joon, K. et al., "An effective document clustering method using user-adaptable distance metrics.", SAC, (2002), pp. 16-20.
Hearst's Fall 1999 Course, SIMS 202 Information Organization and Retrieval: http://www2.sims.berkeley.edu/courses/is202/f99/Lectures.html.
Hearst, M. et al., "Integrating Browsing & Search Relevance Feedback", SIMS 202, UC Berkeley, SIMS, Fall 1999, 2 pages.
Hearst, M. et al., "Using MetaData in Search: Combining Browsing and Search", UCB SIMS, SIMS 202 Fall 98, Lecture 27, pp. 1-39 http://www2.sims.berkeley.edu./courses.is202/f98/Lecture27/sId001.htm.
Hearst, M., "Chapter 10: User Interfaces and Visualization", Modern Information Retrieval, Yates and Ribeiro-Neto, (1999), pp. 257-340.
Hearst, M., et al. "Cat-a Cone: An Interactive Interface for Specifying Searches and Viewing Retrieval Results Using a Large Category Hierarchy" Ann. Int. ACM-SIGIR Conf. on Res. and Dev. in Information Retrieval, (1997) pp. 246-255.
Hinneburg et al., "What is the nearest neighbor in high dimensional spaces", Proceedings of the 26th VLDB Conference, (2000).
Hongyan Jing, "Information retrieval based on context distance and morphology", Proceedings of the 22nd annual international ACM SIGIR conference on Research and Development in information retrieval, pp. 90-96, Aug. 1999.
http://www.searchtools.com/tools/endeca.html, Search Tools Product Report, "Endeca Faceted Metadata Search and Browse", 2 pages, updated Jul. 10, 2003.
Hua et al., "Object Skeletons: An Efficient Navigation Structure for Object-Oriented Database Systems", IEEE, pp. 508-517 (1994).
Huei et al., "Object Signatures for Supporting Efficient Navigation in Object-Oriented Databases", Proceeding of the 32nd Hawaii International Conference on System Sciences, IEEE, pp. 502-507 (1999).
Kummamuru et al., "A Hierarchical Monothetic Document Clustering Algorithm for Summarization and Browsing Search Results", WWW2004, pp. 658-665, May 17-22, 2004.
McEneaney, John E., "Visualizing and Assessing Navigation in Hypertext", Hypertext 99, Darmstadt Germany, pp. 61-70 (1999).
Miller et al., "DataWeb: Customizable Database Publishing for the Web" IEEE Multimedia, 4(4):14-21(1997).
Miller et al., "Integrating Hierarchical Navigation and Querying: A User Customizable Solution" ACM Multimedia Workshop on Effective Abstractions in Multimedia Layout, Presentation, and Interaction, San Francisco, CA, Nov. 1995, pp. 0-7.
Miller, Renee J., "Using Schematically Heterogeneous Structures", *Department of Computer and Information Science, Ohio State University*, 1998, p. 189-200.
Mills, J., "The Problem of arrangement in a Library", A Modern Outline of Library Classification, Chapman & Hall Ltd, pp. 1-8, 1960.
Pedersen, G.S., "A Browser for Bibliographic Information Retrieval Based on an Application of Lattice Theory" Proc. of the Ann. Int. SCM SIGIR Conference on Res. and Deve. in Information Retrieval, (1993), pp. 270-279.
Pi-Sheng, "Using case-based reasoning for decision support", Proceedings of the 27th Annual Hawaii International Conference on System Sciences, (1994), pp. 552-561.
Pollitt A.S., "Intelligent Interfaces to online Databases", Expert Systems for Information Management, vol. 3, No. 1, pp. 49-69, 1990.

Pollitt et al., "Faceted-Classification as Pre-Coordinated Subject Indexing: Multi-Dimensional Searching for OPAC Users", Oslo College, May 6-7, 1998.
Pollitt et al., "MenUse for Medicine: End-User Browsing and Searching of MEDLINE via the MeSH Thesaurus", Int. Forum Inf. and Docum., pp. 547-573, 1988.
Pollitt et al., "MenUse for Medicine: End-User Browsing and Searching of MEDLINE via the MeSH Thesaurus", Int. Forum Inf. and Docum., vol. 13, No. 4, pp. 11-17, Oct. 1998.
Pollitt et al., "Multilingual access to document databases", CAIS/ACSI '93 Information as a Global Commodity—Communication, Processing and Use, Proceedings of the 21st Annual Conference of the Canadian Association for Information Science, pp. 128-140, Antigonish, Nova Scotia Canada, Jul. 1993.
Pollitt, A.S., "A rule-based system as an intermediary for searching cancer therapy literature on MEDLINE", Intelligent Information Systems: Progress and Prospects, pp. 82-126, 1986.
Pollitt, A.S., "An Expert Systems Approach to Document Retrieval, A thesis submitted to the Council for National Academic Awards in partial fulfillment of the requirements for the degree Doctor of Philosophy", May 1986.
Pollitt, A.S., "Expert Systems and the Information Intermediary: Tackling Some of the Problems of Naive End-User Search Specification and Formulation", Intelligent Information Systems for the Information Society, pp. 100-108, 1986.
Pollitt, A.S., Information Storage and Retrieval Systems, Origin, Development and Applications, Ellis Horwood Books in Information Technology, 1989.
Pollitt, A.S., "Reducing complexity by rejecting the consultation model as a basis for the design of expert systems", Expert Systems, vol. 3, No. 4, pp. 234-238, Oct. 1986.
Pollitt, A.S., "Taking a different view", British Library research, Library Technology, vol. 1, Nov. 1, 1996.
Pollitt, et al. "HIBROWSE for Bibliographic Databases" Journal of Information Science, (1994), vol. 20 (6), pp. 413-426.
Pollitt, et al. "View-Based Searching Systems—Progress Towards Effective Disintermediation" Online Information Meeting Proceedings, (1996) pp. 433-445.
Pollitt, Example from EMBASE entitled "Screen Shots from View-based searching with HIBROWSE", (1998).
Pollitt, excerpt from "Prospects for using Dewey Classification in a View-based Searching OPAC Dewey Decimel Classification: Possibilities in View-based Searching OPAC", (1998).
Pollitt, S., "CanSearch: An Expert Systems Approach to Document Retrieval", Information Processing & Management, vol. 23, No. 2, pp. 119-138, (1987).
PriceSCAN.com, Your Unbiased Guide to the Lowest Price on Books, Computers, Electronic,Copyright 1997-1999, <http://web.archive.org/web/19991117123352/http://www.pricescan.com/>, pp. 1-8.
Ramaswami et al., "Navigating a Protection-Engineering Data Base", IEEE, pp. 27-32, Apr. 1989.
Salton et al., "Term-weighting approaches in automatic test retrieval", Information Processing & Management, (1988), vol. 24(5), pp. 513-523.
Shamos et al., "Closest-point problems", Proceedings of the 16th Annual Symposium on Foundations of Computer Science, IEEE (1975).
Story, G.A., et al., "The RightPages Image-Based Electronic Library for Alerting and Browsing" Computer, (1992), vol. 25(9), pp. 17-25.
Treglown, M. et al., "HIBROWSE for Bibliographic Databases: A study of the application of usability techniques in view-based searching", British Library Research and Innovation Report 52, The University of Huddersfield, Apr. 1997.
Tu et al., "Agent Technology for Website Browsing and Navigation", Proceedings of the 32nd Hawaii International Conference on Systems Sciences, IEEE , pp. 1-10, 1999.
Turine et al., "A Navigation-Oriented Hypertext Model Based on Statecharts", Hypertext 97, Southampton UK, 1997.
Velez et al., "Fast and Effective Query Refinement", SIGIR 1997, pp. 6-15.

(56) References Cited

OTHER PUBLICATIONS

Weiland et al., "A graphical query interface based on aggregation/generalization hierarchies," Information systems, vol. 18, No. 4, pp. 215-232 (1993).

Xiong et al., "Taper: A Two-Step Approach for All-Strong-Pairs Correlation Query in Large Databases", IEEE Transactions on Knowledge and Data Engineering, vol. 18, No. 4, Apr. 2006, pp. 493-508.

Yahoo 1996 (Exhibit 12-16).

Yahoo Inc., Yahoo!, copyright 1999, http://web.archive.org/web/19991013122821/http://www.yahho.com/, 22 pages.

Yahoo!, Copyright 1999 Yahoo! Inc., <http://web.archive.org/web/19991116151216/http://www4.yahoo.com/>.

Yoo et al., "Towards a Relationship Navigation Analysis", Proceedings of the 32nd Hawaii International Conference on System Sciences, IEEE, pp. 1-10, (2000).

Ellis, GP, Finlay, JE and Pollitt AS, Hibrowse for Hotels: Bridging the Gap Between User and System Views of a Database, in: Peter Sawyer( ed) Interfaces to Database Systems (IDS 94) Proceedings of the 2nd International Workshop on Interfaces to Database Systems, Lancaster University. Jul. 13-15, 1994 pp. 49-62 BCS Workshops in Computing, Springer Verlag.

Pollitt, A Steven, Smith, Martin P., and Braekevelt, Patrick A.J., View-based searching systems: A new paradigm for information retrieval based on faceted classification and indexing using mutually constraining knowledge-based rules Information Retrieval and Human Computer Interaction. in Johnson C & Dunlop M (Eds) Proceedings of the Joint workshop of the Information Retrieval and Human Computer Interaction Specialist Groups of the British Computer Society. pp. 73-77, GIST Technical Report G96-2, Glasgow University, Sep. 17, 1996.

Pollitt, A Steven, The key role of classification and indexing in view-based searching IFLA '97 Copenhagen Aug. 31-Sep. 3, 1997,63rd IFLA General Conference Booklet 4, Section on Classification and Indexing Session 95 Paper 009-Class-1-E.

Priss, Uta and Jacob, Elin: Utilizing Faceted Structures for Information Systems Design. Proceedings of the 62st Annual Meeting of ASIS, 1999.

Carey, M. et al., "Info Navigator: A Visualization Tool for Document Searching and Browsing", Proceedings International Conference Distributed Multimedia Systems, (DMS Sep. 2003) pp. 23-28.

Cilibrasi, R. et al., "Automatic Meaning Discovery Using Google", 31 pages, www.bsik-bricks.nl/events/ab/google_abstract.html. www.arxiv.org/abs/cs.CL0412098 (2004).

Screenshots from "View-Based Searching With HIBROWSE," http://www.jbi.hio.no/bibin/kurs/korg98/osio2.ppt, 10 pages, 1998.

Hua-Jun Zeng et al., "Learning to Cluster Web Search Results", International ACM SIGIR Conference on Research and Development in Information Retrieval, Jul. 25-29, 2004, pp. 210-217, Sheffield, United Kingdom.

Oren Zamir et al., "Grouper: A Dynamic Clustering Interface to Web Search Results", Computer Networks and ISDN Systems, May 11, 1999, pp. 1361-1374, vol. 31, No. 11-16, North Holland Publishing, Amsterdam, NL.

A.K. Jain et al., "Data Clustering: A Review", ACM Computing Surveys, Sep. 1999, pp. 264-323, vol. 31, No. 3.

Anton V. Leouski et al., "An Evaluation of Techniques for Clustering Search Results", Computer Science Department, University of Massachusetts at Amherst, MA, pp. 1-19, Internet Citation (1996), retrieved on Mar. 7, 2007.

Office Action Mailed on Feb. 6, 2009 for U.S. Appl. No. 11/271,036, filed Nov. 10, 2005.

Office Action Mailed on Dec. 30, 2009 for U.S. Appl. No. 11/271,036, filed Nov. 10, 2005.

Office Action Mailed on May 26, 2010 for U.S. Appl. No. 11/271,036, filed Nov. 10, 2005.

Office Action Mailed on Nov. 10, 2010 for U.S. Appl. No. 11/271,036, filed Nov. 10, 2005.

Hearst, "Finding the Flow in Web Search," pub. Sep. 2002, Comm. of the ACM, vol. 45 Iss. 9, p. 42-49.

Notice of Allowance mailed Apr. 13, 2011, for U.S. Appl. No. 11/271,036, filed Nov. 10, 2005.

* cited by examiner

Applejack

710: '"Applejack'" is a strong alcoholic beverage produced from apples, originating from the American colonial period. It is made by concentrating hard cider (as British cider, i.e., fermented alcoholic apple juice, is called in American usage), either by the traditional method of freeze distillation, or by true evaporative distillation. The term "applejack" derives from "jacking", a term for freeze distillation. From the fermented juice, with an alcohol content of less than ten percent, the concentrated result contains thirty to forty percent alcohol (i.e., is sixty to eighty proof), is slightly sweet, and tastes and usually smells of apples. Freeze distilling can concentrate methanol and fuse alcohols (by-products of fermentation which true distillation separates out) in applejack to unhealthy levels. As a result, many countries prohibit such applejack as a health measure. Due to the relatively higher cost and lower yield of alcohol produced from fruit fermentation, commercially produced applejack may be composed of apple brandy diluted with grain until the drink reaches an alcohol content of thirty to forty percent. "Applejack" is also a type of hat, popular in the early 20th century and with Rastafarians. There is also a famous American breakfast cereal known as Apple Jacks. '"Applejack'" is also the title of a song written and performed by Dolly Parton. The song first appeared on Parton's 1977 album "New Harvest - First Gathering".

720:
TERMS > alcohol
TERMS > alcohol content
TERMS > apple brandy
TERMS > apple juice
TERMS > applejack
TERMS > cider
TERMS > distillation
TERMS > fermentation
TERMS > freeze distillation
TERMS > juice
TERMS > Dolly Parton
TERMS > Rastafarians

METHOD AND SYSTEM FOR INFORMATION RETRIEVAL WITH CLUSTERING

BACKGROUND OF THE INVENTION

1. Field of the Invention

The invention relates generally to methods and systems for information retrieval, and in particular to methods and systems for clustering and for query refinement.

2. Background and Related Art

In an information access system for a collection of documents or other information objects, one basic challenge in the information retrieval process is formulating a query with sufficient precision to locate the materials of interest to the user. Furthermore, a set of search results responsive to a user's query may not satisfy the user's objectives for a number of reasons. The search results are often more numerous than a user can readily work with. In addition, a user may wish to obtain more initial information about the search results. For example, the results may fall into discrete topical areas or have other relationships that would be helpful to a user trying to find particular information.

Clustering of search results is one way of presenting commonalities between search results. Clustering involves presenting results in clusters (i.e., groups), where results within a cluster are intended to be more similar to one another than results that are not in the same cluster. Each cluster is generally semantically coherent. By seeing results organized into clusters, users can hone in on a subset of results that best matches their needs.

Automatic clustering of search results has been investigated as a methodology for improving information access. The "cluster hypothesis" states that mutually similar documents will tend to be relevant to the same queries, and, hence, that automatic determination of groups of such documents can be used to improve search results. A typical system that uses clustering to respond to a query will return several groups of results that are classified in some way.

Typically, search results are clustered into a partition, disjoint or otherwise, or into a hierarchical tree structure. In the case of a partition, each one of the search results is assigned to one or more groups of results, also known as clusters. Results assigned to the same cluster are presumed to be more similar than results assigned to distinct clusters. In the case of a hierarchy, the clusters are themselves broken up into clusters.

There are at least two weaknesses in the existing approaches for automatic clustering of search results. The first is that the clustering feature is a "black box" to users who interact with it: users do not necessarily understand the basis for the clustering, and can be particularly frustrated when the clustering does not seem to map well to their model of the information domain. The second is that the clustering is a one-shot occurrence: users are limited to the original search results and original clustering and cannot use clustering as a basis for progressive query refinement.

In accordance with the clustering hypothesis, automatic clustering attempts to assign mutually similar results to the same cluster. Existing approaches generally measure the similarity between results using a vector space model: each item is associated with a vector corresponding to features associated with that item.

For example, if the search results are text documents, then the features may be words in the document, and the vector for a document may contain a dimension for each word in the document, the coefficient of each dimension being the frequency or information weight of that word for the document.

The vector space approach interprets search results as vectors in what may be a very high-dimensional vector space. For both quality and efficiency reasons, some vector space approaches apply feature reduction to project the high-dimensional vector space onto a lower-dimension space. A well-known example of feature reduction is Latent Semantic Indexing, which uses an eigenvector analysis in order to perform feature reduction.

Whether the vector space is used as is or transformed through feature reduction, the vector representation of results is not necessarily intuitive to human beings. Moreover, the determination of similarity among results reflects computations that are unlikely to be obvious to most users of an information access system. As a result, users do not necessarily understand the basis for the clustering. Finally, the clusters themselves have representations that have mathematical meaning, but are unlikely to be comprehensible to human beings.

Moreover, the similarity model may be flawed in certain respects, or at least may not always correspond with how users model the information domain. Since users do not understand the operation of the clustering algorithm, they are unlikely to determine why the information access system is showing them unsatisfactory results. This impedes their ability to improve their search strategy and also causes dissatisfaction with the search experience.

Another existing approach to clustering is to automatically extract signatures from a corpus of documents, cluster related signatures (e.g., noun phrases) to generate concepts, and arrange the concepts in a concept hierarchy. This approach can address the "black box" weakness, since a cluster is represented as a collection of noun phrases. This approach, however, exacerbates the one-shot occurrence weakness. Unlike the hierarchical clustering described earlier, this approach constructs a predetermined hierarchy for the entire corpus of documents, rather than in response to a query. As a result, the concept hierarchy is a least common denominator of clusterings for all possible queries, rather than a clustering that is particularly suitable for any particular query.

As noted earlier, existing approaches for clustering typically either partition search results into a set of clusters or produce a hierarchical tree structure that statically partitions results into subgroups. Neither of these approaches is suitable for progressive query refinement.

Query refinement is another technique that is used to improve search results, by allowing a user to iteratively query the collection, improving the query each time, until the desired documents are located. In a typical query refinement approach, a user enters a search query and then is shown search results plus possible new search queries that can be used as alternatives to the original query. These suggested alternatives may be intended to narrow or broaden the original query, or may be lateral modifications.

In order to implement a query refinement feature, a system must have a way of generating query alternatives based on the original query, the search results, or some combination thereof. Since the query alternatives are used to replace the original query, they should be represented in a way that makes them meaningful without the context of the original query or search results.

Query refinement is typically an independent feature from clustering. Existing approaches to clustering in a search system typically use clustering only to organize search results. Existing approaches typically create clusters based on the computation of similarity among the results themselves. As a result, the clusters are groupings of documents, and the clustering only has relevance to that particular set of results. If the set of results under consideration changes, i.e., if the query is modified, then the clustering breaks down because the clustering is dependent on the initial set of results. The clusters of documents themselves cannot be manipulated in any meaningful way and, in particular, cannot be readily used to formulate a new query. Even hierarchical clustering suffers from this limitation, as it is generated by statically partitioning the original search results. At most, existing approaches enable a limited query refinement that narrows within the original search results using the generated hierarchy of clusters and does not regenerate or re-cluster the documents that belong to the selected branch.

BRIEF SUMMARY OF THE INVENTION

The present invention generally relates to information access systems. The present invention includes computer-implemented methods, computer-program products and systems that enable searching with clustering in information access systems. Methods of clustering in accordance with the present invention operate on a collection of materials wherein each item in the collection is associated with one or more properties. In one aspect of the invention, an initial subset of materials is selected from the collection and a plurality of properties associated with the subset of materials are clustered into property clusters. Each property cluster generally contains properties that are more similar to each other than to properties in a different property cluster. Some materials in the collection are associated implicitly with each property cluster based on the associations between individual items and properties. In one aspect of the invention, the property clusters can be used to obtain corresponding groups of materials by mapping certain materials to the property clusters. In one aspect of the invention, the property clusters and respective sets of materials can be provided in whole or in part, and optionally in combination with the initial subset of materials, to respond to a received query. In certain embodiments, one or more property clusters can be used for iterative query refinement. In one aspect of the invention, a cluster can be automatically translated to a query form.

Some embodiments of the invention are directed to a method for searching a collection of materials in response to a search query. The query can be specified, e.g., as a free-text query or a user-selection-based navigation query. In certain embodiments, initially, a set of materials responsive to the original search query are identified. From the result set of materials, a set of relevant properties associated with the result set of materials is derived. Different embodiments can use different mechanisms to obtain this property set; for example, a particular embodiment might derive this set from the union of sets of properties associated with each material in the retrieved set of materials, or might compute this union and then apply filtering techniques to it.

The relevant properties are grouped into one or more clusters by measuring the similarity (or, equivalently, distance) of properties, with the aim that properties that are grouped into the same cluster are more similar (or less distant) than the properties that are grouped into different clusters. Different embodiments of the invention can take different approaches to measuring similarity. An exemplary embodiment of the invention uses co-occurrence to measure similarity—that is, it measures the similarity of two properties based on the number of materials from the retrieved set of materials that both properties are associated with. Other embodiments can employ different similarity metrics, including, but not limited to, processes that take into consideration distance metrics among more than two properties; distance metrics calculated on the basis of the entire set of materials and their associated properties; and distance metrics that retrieve information from a specialized vocabulary of property information. Particular embodiments can utilize specific restrictions on the grouping mechanism, including, but not limited to, restrictions on the number of clusters and the number of properties per cluster; and the process that determines particular sets of properties that are assigned to a particular cluster. As a result of these restrictions, it is possible that not all of the properties will end up in the final clusters. Also, the clusters may or may not be disjoint.

In certain embodiments, each property cluster can be associated with a corresponding set of materials using a mapping function applied to the associations between materials and properties. Particular embodiments can utilize different mapping mechanisms. In one particular embodiment, only those materials that are associated with at least one property from a particular cluster are mapped to the cluster. In another embodiment, only those materials that are associated with all properties from a particular cluster are mapped to the cluster. In another possible embodiment, only those materials that are associated with at least two properties from a particular cluster are mapped to the cluster. Other embodiments can use different mapping mechanisms on the spectrum between at least one property and all properties, and may be specified in different ways, e.g., at least three properties, at least half of the properties, etc. In certain embodiments, the mapping can be carried out by translating a cluster to a query format.

In another aspect of the invention, certain embodiments enable iterative usage (e.g., query refinement in the context of a search system) by modifying an original query utilizing one or more property clusters. Various embodiments enable the query to be modified in different ways, which include but are not limited to: modifying the query so that the result is the union of the original result set of materials and the set(s) of materials associated with particular cluster(s) (broadening); modifying the query so that the result is the intersection of the original result set of materials and the set(s) of materials associated with particular cluster(s) (narrowing); and modifying the query so that the result is the set(s) of materials associated with a particular cluster(s) (lateral).

Some embodiments of the present invention are directed to an information access system that operates on a collection of materials, each of which is associated with one or more properties. In certain embodiments, the system executes a query against the collection, obtaining an original result set composed of materials from the collection that match the query. The system derives a set of relevant properties from the properties associated with the matching set of materials, and assigns properties selected from the relevant properties to one or more clusters. The system employs a distance metric to measure the similarity between properties, and assigns properties to clusters in such a way that two properties assigned to the same cluster are generally more similar than two properties assigned to distinct clusters. In some embodiments, the system associates each property cluster with a set of corresponding materials by a mapping function that is based on the associations between the materials and the properties. The combined set of materials associated with all of the property clusters can include the original result set, or include only part of the original result set or may include documents not in the original result set. The system uses one or more property clusters and, optionally, corresponding documents to respond to the query. The system allows users to apply one or more clusters to modify the query. The system executes the modified query, enabling an iterative mode of searching. The modified query can also be executed using clustering in accordance with embodiments of the invention. The process can be repeated until a document or documents of interest to the user are located.

Certain embodiments of the invention have particular utility in allowing iterative searching on corpora of natural language documents, in which each document is associated with a set of properties composed of topically salient terms.

For ease of presentation, "materials", "items" and "documents" are used interchangeably to refer to the collection being searched. As used herein, "properties" are related to and may be derived from but are generally distinct from objects identified by the foregoing terms. "Properties" are information-bearing descriptors, which can include terms extracted from a document; however, in preferred embodiments, a set of properties associated with a document does not encompass the full-text of the document. Although the properties are typically associated with the materials beforehand, the properties can also be associated at the time the query is being executed, especially when the materials are text documents. Embodiments of the invention are applicable to environments incorporating free-text searching or selection-based navigation or any other technique for specifying a query; accordingly, "searching" and "navigation" are at times used interchangeably. The invention has broad applicability and is not limited to certain types of materials or properties. It does not depend, for example, on particular algorithms or mechanisms that assign properties to materials, measure property-to-property distance, group properties into clusters, map property clusters to material sets, or modify the query utilizing one or more clusters.

BRIEF DESCRIPTION OF THE DRAWINGS

The invention, including these and other features thereof, may be more fully understood from the following description and accompanying drawings, in which:

FIG. 7 is a representation of an exemplary document and terms in accordance with an embodiment of the invention;

DETAILED DESCRIPTION OF THE ILLUSTRATED EMBODIMENTS

Figure 1:
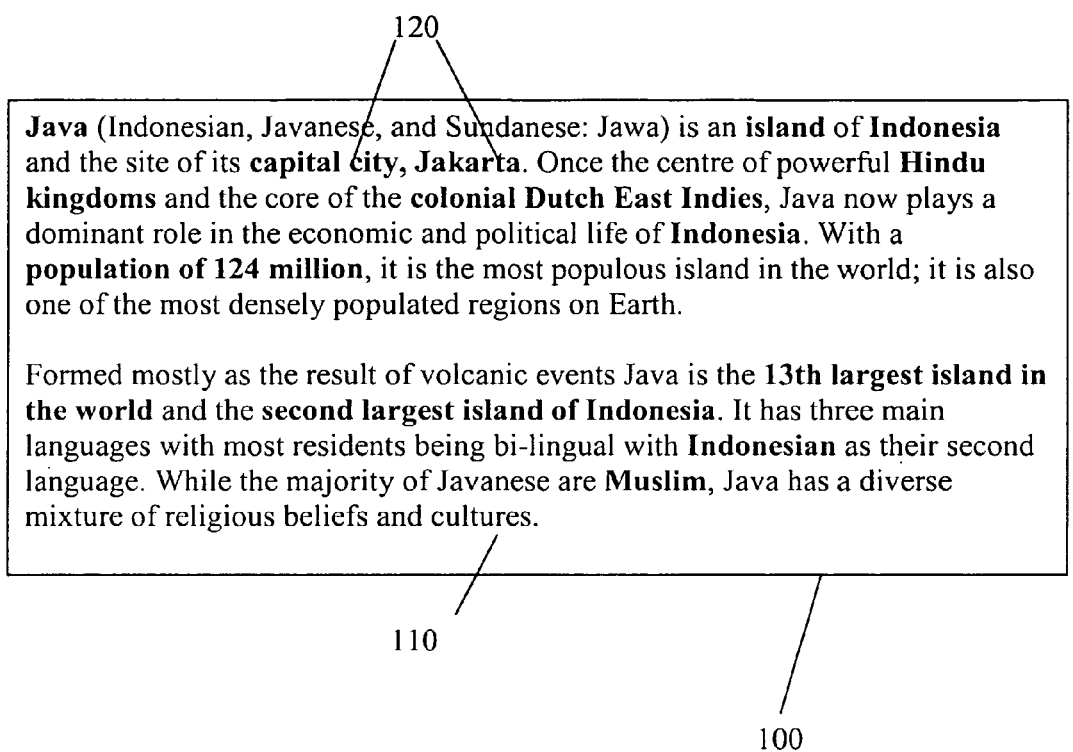
FIG. 1 is a representation of an exemplary document with salient terms highlighted.

Preferred embodiments of the present invention include computer-implemented methods, computer program products, computer-readable media, and systems for information retrieval from a collection of materials in a database, in which the materials are each associated with a set of properties. In preferred embodiments, a response for a query includes clusters of properties (and, optionally, corresponding materials) that are relevant to the original query. Preferred embodiments group properties derived from an original query (e.g., properties associated with an original result set of materials responsive to the original query), into clusters and map the clusters to materials in the database to identify materials in the database that correspond to each cluster. A response to the query can incorporate one or more clusters of properties, the original result set, and/or one or more sets of materials that correspond to a cluster. In addition, in certain embodiments, the original search query can be modified based on one or more property clusters, thus enabling iterative navigation of the materials. In preferred embodiments, a property cluster selected for use in modifying the original query is translated to a query format, in accordance with a desired mapping function, and combined with the original query using a query operator. The modified query can be processed using a similar technique to the original query, with clustering of properties related to the modified query, or can be processed using a different technique.

Embodiments of the invention are generally applicable to a collection of any type of materials stored in a database. The materials could include text documents, images, web pages, sound clips, etc. Each item of the materials is associated with a set of properties. The properties are generally information-bearing values that are descriptive of the materials and a particular property is generally associated with an item if it is descriptive of the respective item. The properties could be words, numbers, codes, ranges, dates, ratings, etc. For example, for an image, the set of properties could include a date (expressed as a specific date or as a range), the content of the image, any text visible in the image, whether the image is color or black and white, the name of the person who created the image, etc. In some embodiments wherein the materials in the collection represent text documents, each document has an associated set of properties that represent the set of salient information-bearing terms contained in that document. In general, for a given document, the set of associated properties is distinct from the full text of the document. The properties could be automatically extracted from the materials or could be defined in a knowledge base using some other type of coding technique. The materials could be pretagged with properties, or in certain embodiments, when the properties can be readily extracted from the materials, e.g., salient terms from text documents, the properties can also be associated at query run-time.

For ease of illustration, this discussion focuses on one particular class of embodiments of the present invention, in which the materials in the collection represent text documents, and each document is annotated with a set of properties that represent a set of salient (information-bearing) terms associated with that document. In other embodiments, the materials may represent non-textual content, or their properties may be obtained by other means. The features of the specific embodiments described herein apply generally to other embodiments.

An exemplary embodiment of the present invention is a computer-implemented search system, operating on a set of materials that is composed of text documents, in which each of the text documents has a set of associated properties. The properties are information-bearing terms or descriptors that are contained in or describe an associated document. In general, in a search system, the object of executing a search query is to obtain a set of materials that are responsive to the query, and secondarily, to enable the user to refine the query to improve the results. The system of the exemplary embodiment uses known techniques to retrieve documents matching a specified query.

By way of illustration, in one particular embodiment, the system enables searching of a set of newspaper articles, in which each article is annotated with a set of salient terms. In this embodiment, the set of properties associated with a document include salient terms extracted from the document text. FIG. 1 illustrates a portion of an exemplary document 100 including text 110 and, shown in boldface type, salient terms 120 selected from the text.

The system, receiving the search term "java", will obtain an original result set of articles that all include the exact term "java". The system will group the associated salient terms for the set of articles into clusters. In general, the clusters suggest the topical segmentation of the result set. These clusters will typically correspond to the primary meanings of the search term; in this case, "java" as (1) an island, (2) a programming language, and (3) a synonym for coffee. Where, by way of example, the salient terms obtained from the original result set include applet, arabica, Bali, computer, coffee, drink, espresso, Indonesia, island, Jakarta, language, and Sun Microsystems, the following clusters are obtained:
Cluster 1: Indonesia, island, Bali, Jakarta
Cluster 2: computer, language, Sun Microsystems, applet
Cluster 3: coffee, drink, espresso, arabica The clusters may be provided to the user. When the user selects one cluster—for example, the first one—in this embodiment, the system can narrow down the selected document set according to the first clustered set of terms to documents that correspond generally to Java, an island in Indonesia. This exemplary embodiment utilizes a partial matching mechanism, requiring the matching document to contain only two or more of the terms that belong to the selected cluster, not necessarily all of them. This mechanism improves recall, i.e., the percentage of documents that would be responsive to the query that are actually returned to the user. The user selection effectively identifies a second result set, and the system can apply the same process to it, generating a new set of salient terms from the documents in the selected result set and grouping those into clusters, which, for example, will correspond to different aspects of "java" as an island in Indonesia:
Cluster 1a: travel, tourism, air fares, beaches
Cluster 1b: capital, government, economy, rupiah
Cluster 1c: Hinduism, Buddhism, Islam
Cluster 1d: Aceh, East Timor, separatists Successive refinements after selecting, for example, cluster 1a, will allow the user to select the set of documents that describe Indonesia as a tourist destination and continue the process of navigation until the desired document(s) is/are located.

One advantage of the invention is attained because the clustering operation is performed on the terms, rather than the documents, and the result can be represented as clusters of terms, not only documents. One consequence is that each document can belong to more than one cluster. This aspect, combined with the partial matching mechanism used in this embodiment, ensures that at each step of iterative refinement, recall is maximized.

Another advantage of the invention is attained because at each navigation step (until a result set with one or more desired documents is reached), the user can select a cluster to iterate the search by modifying the original query. This technique for refining the query allows the system to achieve high precision. The combination of this feature with the clustering of terms allows the system to break the traditional precision-recall tradeoff and achieve high precision, high recall navigation.

Figure 2:
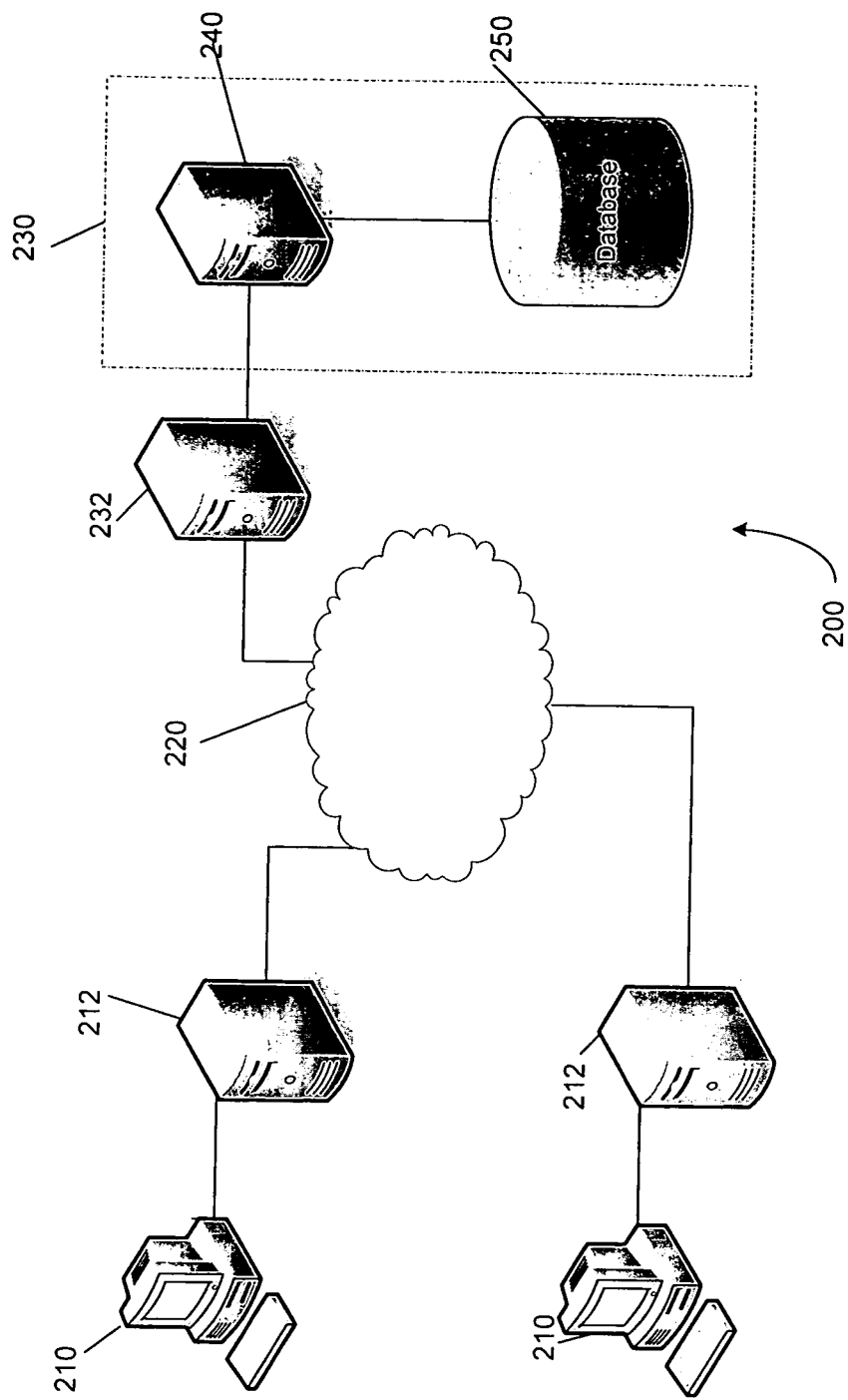
FIG. 2 is a schematic representation of the organization of a database in accordance with an embodiment of the invention.
Figure 3:
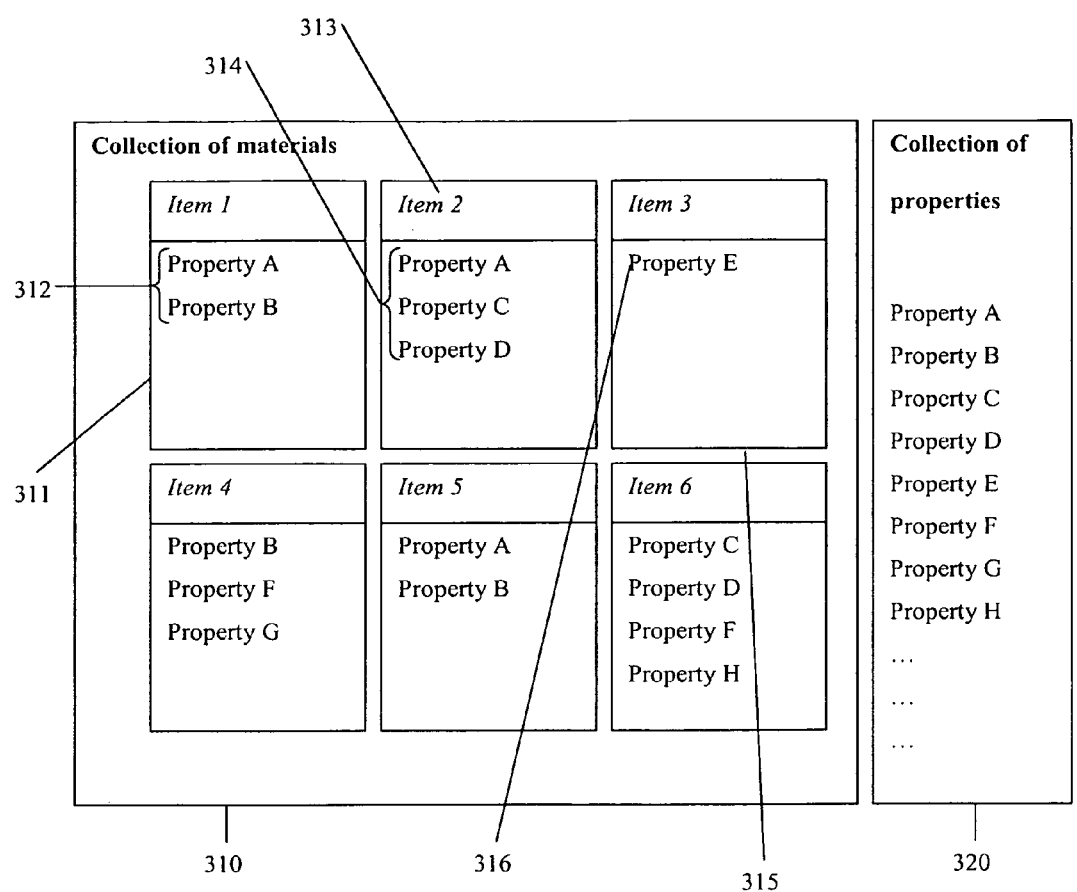
FIG. 3 is a block diagram of a representative system wherein certain embodiments of the invention may be implemented and used.

In summary, the search system according to an exemplary embodiment extracts salient properties from the set of materials that correspond to the results of a search query, and groups this set of properties into clusters that, in turn, can be mapped to a set of materials. As a result of the clustering of the properties, the corresponding materials are by implication organized into semantically coherent groups. The system also provides the ability to iteratively refine a search query by incorporating property clusters. FIG. 2 illustrates a block diagram of a representative computing environment 200 wherein the exemplary embodiment of the present invention may be implemented and used. A user system 210 is in communication with a data communications network 220, such as a public data communications network, for example, the Internet, or a private data communications network, such as a private intranet. Web browser software operates on user system 210. In response to input from a user, user system 210 generates and transmits requests for information over the Internet/intranet 220 to Web servers, such as Web server 212. The Web server is in communication with the data communications network 220. Search system 230 enables searching of a target collection of text documents. Search system 230 is in communication with the communications network 220 via Web server 232 and is accessible to a user through a Web site. In search system 230, a search application operates on a search server 240, in communication with a database 250. Database 250 includes storage for a collection of text documents, and, for each document a set of terms associated with the document, wherein the terms are salient terms extracted from the text of the respective document. FIG. 3 illustrates schematically how information is organized in the database. The primary components of the database are a collection of materials 310 and a collection of properties 320. Each item 312, 314, 316 in the database is associated with one or more properties, Property A, Property B, etc. The collection of properties 320 is formed of all of the properties associated with any of the materials in the database. A user can access the search application over the network 220 from user terminal 210. In response to a search query entered by a user, user system 210 transmits the search query to the search system 230 over the network 220. In lieu of, or in addition to, user system 210, other embodiments may include access to the search system 230 by an application program via an application program interface.

Figure 4:
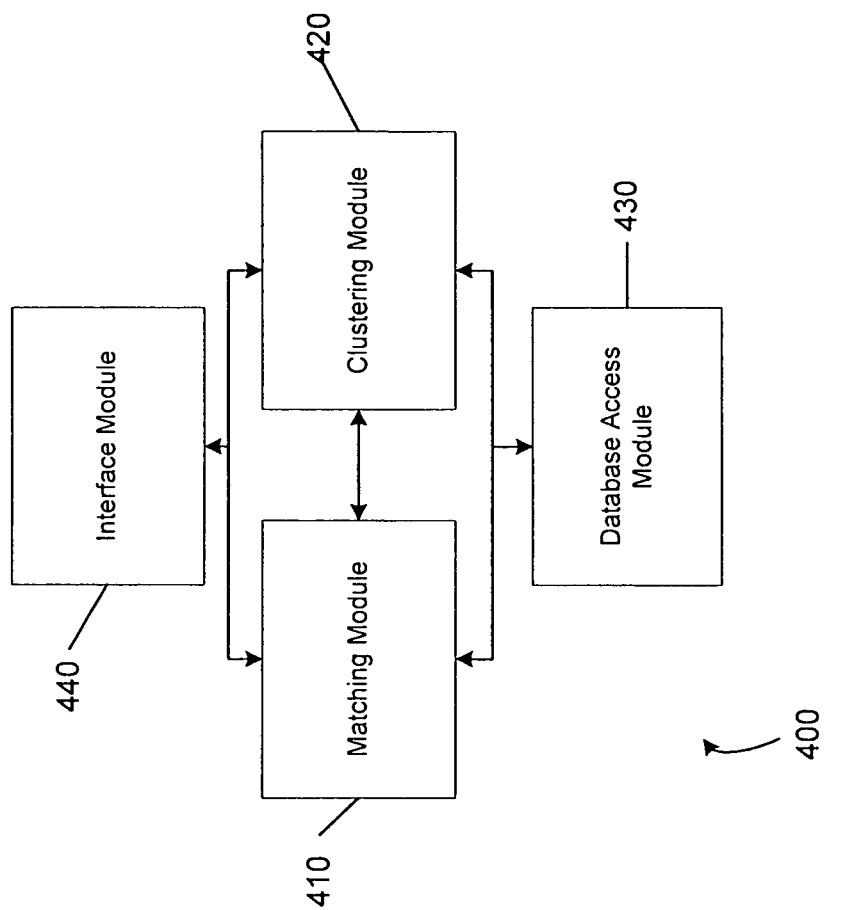
FIG. 4 is a block diagram of the architecture of a search application in accordance with an embodiment of the invention.

FIG. 4 is a block diagram illustrating the software architecture of the search application 400. The search application includes a matching module 410 and a clustering module 420, as well as a database access module 430. The database access module 430 is in communication with the database and is used to retrieve information from the database. The database access module 430 is used by both the matching module 410 and the clustering module 420. The matching module 410 provides query pre-processing and other functions related to formatting a query and identifying results for a query. The clustering module 420 provides identification of relevant properties, clustering of properties, and translation of properties to query-like form and other functions related to the clustering feature. The interface module 440 accepts queries and provides responses to queries generated by the matching module 410 and/or the clustering module 420.

According to one embodiment, software may be stored on a computer-readable medium Such storage typically includes a computer readable and writeable nonvolatile recording medium in which signals are stored that define a program to be executed by a computer processor or information stored on or in the medium to be processed by the program. The medium may, for example, be a disk, flash memory, CD or DVD-ROM.

Figure 5:
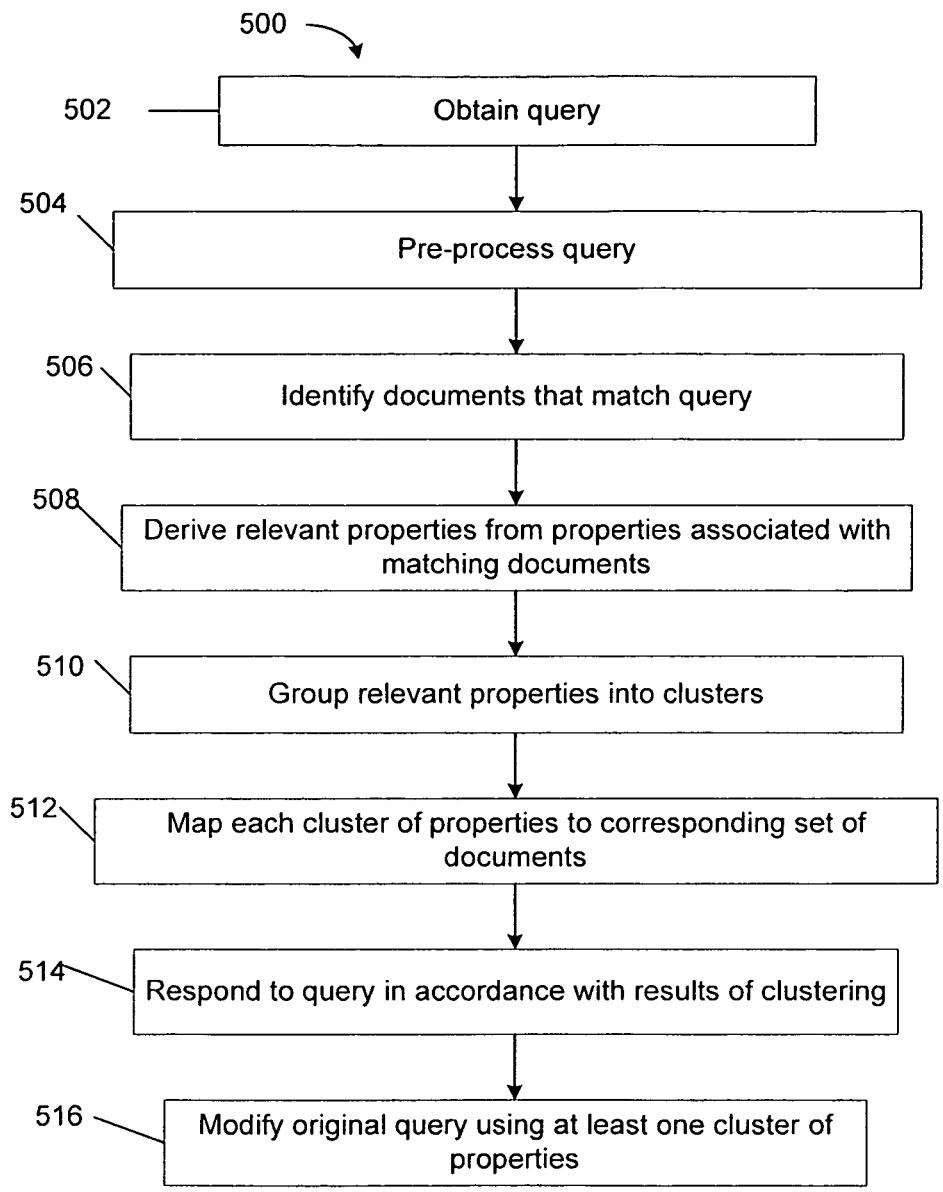
FIG. 5 is a flow diagram illustrating the steps for performing a search in accordance with an embodiment of the invention.

FIG. 5 illustrates an exemplary flow diagram of the operation of the search application 400. Process 500 includes the steps employed by search system 230, running search application 400, for processing a search query received from a user in accordance with a particular embodiment of the invention. In step 502, the search system 230 obtains a search query. The search query may be entered as a free-text query. In step 504, the search system 230 may pre-process the query, applying known query interpretation techniques, such as spelling correction. This step is generally not applicable in a navigation based system. In step 506, the search system 230 identifies an original result set of documents from the collection of documents that match the original query using known document retrieval techniques. In step 508, the search system 230 derives a working set of relevant properties from the sets of properties associated with the documents in the original set of documents. As part of this step 508, the search system 230 could obtain all of the properties that have an association with any of the documents in the original result set of documents. Step 508 can be implemented in a number of ways, however, discussed further below. In step 510, the search system 230 then groups the relevant properties, dividing them into clusters. The properties are clustered in accordance with a distance metric, such that two properties in the same cluster are generally more similar to each other than two properties in different clusters. Based on the associations between documents 311, 313, 315 and property sets 312, 314, 316 in the database, each cluster of properties is implicitly associated with documents in the database. The specific correspondence between a cluster of properties and documents in the database can be defined in a number of ways. In step 512, the search system 230 maps each cluster of properties to a set of documents that correspond to the cluster of properties in accordance with a mapping function. In step 514, the search system 230 responds to the query in accordance with the results of clustering by including information about the property clusters in the response. The search system 230 can also present options for modifying the original search query by applying one or more property clusters. In step 516, the user can use at least one property cluster to modify the original query and formulate another query. Each step, and alternative embodiments of each step, are described in detail hereinbelow. The modified query can be processed using the same sequence. Steps 502, 504, and 506 can be omitted when the modified query is already associated with documents, e.g., as a result of executing the original query.

Figure 6:
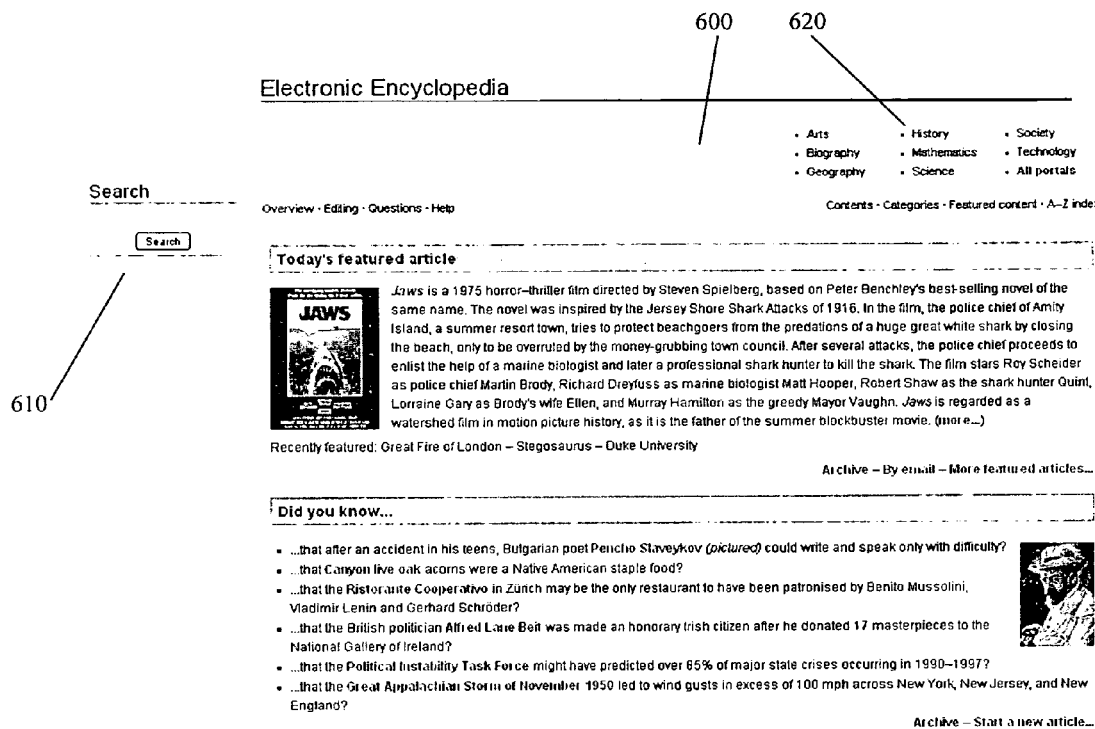
FIG. 6 is a representation of an interface for accessing an exemplary database composed primarily of text documents in accordance with an embodiment of the invention.

In various embodiments, the user interface of the search system 230 may be implemented in various ways. Any technique for specifying a search to a database may be used in embodiments of the invention. These include free-text search and navigation interfaces. FIG. 6 illustrates an interface 600 for one embodiment of a search system in accordance with the present invention. Interface 600 includes a box 610 for free-text searching of the collection. The collection of materials searchable through interface 600 is composed of documents that comprise entries in an electronic encyclopedia.

In some embodiments, a query may be entered using a keyword search interface. This keyword search function may employ any combination of known features of such mechanisms, including, but not limited to, term stemming, multi-term phrase matching, Boolean and proximity query operators, etc. In a preferred embodiment, the keyword search is performed not on the entire text of the materials but rather is restricted to the words or phrases deemed to be salient for materials.

In some embodiments, a query may be entered using a browsing or navigation interface. U.S. Pat. Nos. 7,035,864 and 7,062,483 describe certain navigation interfaces with which embodiments of the invention may be used and are incorporated herein by reference. In one type of such interfaces, a query may correspond to an expression of attribute-value pairs, based on the attributes used to characterize the materials and the values defined for those attributes. Multiple independent attributes can preferably be navigated in combination. For example, if the material set is that of newspaper articles, a query might be Section=Sports AND (Month=October OR Month=November) AND Year=2006. The embodiment illustrated in FIG. 6 enables free-text searching as well as selection-based navigation using a directory 620.

An embodiment may combine the functionality of keyword searching and navigation. For example, an embodiment that combines the two search mechanisms described above might have a query of the form Section=Sports AND (Month=October OR Month=November) AND Year=2006 AND Keywords="new york yankees".

Properties can be identified and associated with a document in various ways. In some embodiments, the properties may be specified manually. In some embodiments, the properties may be determined automatically. The properties may also reflect a combination of manual and automatic techniques. Although the properties will typically be associated beforehand, in some embodiments, the properties may be associated at query run-time. In certain embodiments, the search system could generate the associations between properties and documents. As discussed above, in one class of embodiments, the materials are natural language text materials, and the set of properties associated with each item are terms. The terms may be single-word terms or compound terms or phrases. These terms may occur in the text as is, or may be linguistically related to terms that occur in the text (e.g., via stemming or a thesaurus). FIG. 7 illustrates one document record 700 from the on-line encyclopedia depicted in FIG. 6. The document record 700 includes the document text 710 and is associated with a list of terms 720 from the document text. A number of procedures can be used to derive the list of terms from the document, or more generally, properties for an item in the database.

Some automatic techniques for deriving the properties from the text include the following: (i) Capitalized phrases (for example, "United States"), to detect proper nouns (with proper processing of sentence-start words); (ii) Frequent word sequences; (iii) Noun sequences (assisted with noun dictionary lookup); (iv) Bayesian entity extractor (a known technique from the field of machine learning, where a training set is utilized to assist an algorithm to extract similar entities from the text); and (v) Natural language parsing: each token is assigned a part-of-speech tag, after which step tag sequences can be collated into noun phrases utilizing particular patterns, for example "zero or more adjectives followed by one or more nouns", or "one or more nouns, one preposition, one or more nouns". In a preferred embodiment, properties are obtained from text documents by extracting noun phrases with high information according to standard information retrieval techniques.

Some of these techniques are language dependent; for example, capitalization has different meaning in English and German, and may not even apply in other languages.

Certain embodiments of the present invention may also employ case- and stem-folding, interpreting different capitalizations (e.g., in the beginning of a sentence) and singular/plural stem forms as the same noun. Other similar techniques may be used to consolidate variant forms of a property.

Certain embodiments may utilize filters to determine which terms are most salient. Such filters may be applied globally to the terms for the entire set of materials, or may be applied on a per-material basis.

Certain embodiments of the present invention may utilize one or more of the following techniques, or others, to globally filter terms for the entire set of materials: (i) a stop list; (ii) an "exclude" pattern, or a set of patterns (or, vice versa, the failure to match an "include" pattern or a set of patterns); (iii) a frequency maximum (i.e., the term is seen in too many of the materials, measured either in absolute number of terms or relative to size of the collection)—in an embodiment where terms correspond to phrases occurring in the text, a very high-frequency phrase is more likely to be uninformative; (iv) a frequency minimum (seen in too few of the materials, measured either in absolute number of terms or relative to size of the collection)—in an embodiment where terms correspond to phrases occurring in the text, a very low-frequency term is more likely to be too specific to be useful for clustering; and (v) more complicated statistical techniques, such as the width of the distribution of a particular property across the collection of materials; for example, the shape of the distribution of a particular term across the materials may indicate the informativeness of that term—in an embodiment where properties correspond to terms occurring in the text, the shape of the distribution may be used to distinguish topical from non-topical phrases.

Certain embodiments of the present invention may utilize one or more of the following techniques to globally filter terms on a per-material basis: (i) within-material frequency—in an embodiment where properties correspond to terms occurring in the text, frequency within the text may be an indicator of relevance; frequency may be measured in absolute number of terms, or relative to the frequency of a term in the overall collection of materials; and (ii) favoring of the opening and/or closing sections of a material; in an embodiment where properties correspond to phrases occurring in the text, text in these sections may be particularly representative of the material as a whole; if a material contains an explicit title or abstract section, occurrences in this section may also be favored.

In embodiments wherein searching is by navigation, the navigation options can overlap with or be distinct from the properties used for clustering. One advantage of clustering is that unique combinations that would not otherwise be reached can be generated.

In step 506, a search is performed using known techniques to identify a set of matching results for the query. U.S. application Ser. No. 10/027,195 describes certain methods for finding materials related to one another which could be used in some embodiments and is incorporated herein by reference. The clustering techniques described herein are useful with as few as one item in the set of original search results. A single document could contain two or more concepts and therefore give rise to two or more clusters of properties. In a system that is not a search system, for example a document classification system, a starting point for the clustering operation may be obtained using other techniques. For example, a starting point could be obtained by identifying a set of documents that were created during a desired time interval.

Clustering is performed on a working set of properties that are relevant to the original query and in particular derived from the sets of properties associated with the items in the query results. In the class of text-document based embodiments, the working set of properties to be grouped are properties that correspond to salient terms associated with the set of materials that correspond to the results of a search query. The working set of properties may be identified by a number of techniques, including (but not limited to) the following: (i) computing the union of all properties that are associated with at least one of the result materials; (ii) computing the union of all properties that are associated with at least some minimum number of result materials; this minimum may be specified in absolute number of materials, or relative to the size of the set of results, e.g., a percentage of the results between 0% and 100%, for example, 1%; properties with frequency below this minimum may be presumed to be too rare to be informative, either generally or in the context of the results; (iii) computing the union of all properties that are associated with at most some maximum number of result materials; this ceiling may be specified in absolute number of materials, or relative to the size of the set of results, e.g., a percentage of the results between 0% and 100%, for example, 50%; properties with a frequency above this maximum may be presumed to be too common to be informative, either generally or in the context of the results; (iv) computing the properties that are highly correlated to the result materials; for example, the set of materials in the results that are associated with a property can be compared to two supersets: the entire set of result materials, and the set of materials in the entire set of materials that are associated with the property; if the set of materials in the results that are associated with a property is large relative to these two supersets, then the property may be deemed highly correlated to the result materials and thus salient for those results; (v) computing the properties that are related to the query; in certain embodiments, properties may be filtered or scored based on their linguistic or semantic relationship to query elements, e.g., keywords or navigational selections; in some embodiments, properties that are too closely related to the query may be eliminated because they are deemed redundant; conversely, properties that are insufficiently related to the query may be eliminated because they are deemed irrelevant; and (vi) filtering properties that are subsumed by other properties, based on linguistic or semantic relationships; for example, if one property is a subphrase of another (e.g., "sweater" is a subphrase of "cashmere sweater"), then one or the other property may be eliminated to avoid redundancy.

In certain embodiments, sampling may be used to improve the efficiency of extracting properties from the query results. Sampling techniques include (but are not limited to) the following: (i) sampling an absolute number of materials, e.g., 1,000; preferably, these are sampled randomly to ensure that they are representative of the results; (ii) sampling a fraction of the materials, e.g., 10%; preferably, these are sampled randomly to ensure that they are representative of the results; and (iii) sampling until achieving a termination condition; the termination condition may be based on the number of identified properties, or the stability of the set of identified properties, i.e., the sampling proceeds until this set meets a convergence criterion. Different embodiments may utilize other known algorithms for data sampling.

In embodiments of the invention, the relevant properties are grouped into clusters. In some embodiments of the invention, one function of clustering is to identify materials related to the query in addition to the original result set. In some embodiments of the invention, one function of clustering is to provide materials responsive to the query arranged into coherent groups. In certain embodiments, clustering can be used to identify relevant documents and to group the relevant documents into semantically coherent groups. The relevant properties are grouped into clusters of similar properties, and these clusters of properties are used to obtain coherent sets of materials, responsive to the query, based on the associations between materials and properties.

In an exemplary embodiment, the grouping of properties involves two interrelated aspects: (i) a method for computing the similarity (or, equivalently, distance) between two (or more) properties and (ii) a method of using these similarity computations in order to assemble groups of properties.

In embodiments of the invention, similarity is computed relative to the relevant properties. In certain embodiments, similarity is computed on a pair-wise basis. Each pair of the relevant properties is assigned a score that can be used for clustering. There are a variety of statistical measures to compute similarity between two properties. These include (but are not limited to) the following: (i) computing the number of materials associated with both properties; (ii) computing the number of materials associated with both properties as a fraction of the number of materials associated with at least one of the properties; and (iii) computing the number of materials associated with both properties as a fraction of the number of materials associated with the more frequent of the two properties.

In some embodiments, the similarity between two properties may be derived based on the materials in the query results containing those properties. In other embodiments, materials outside of the query results may also be considered. Some embodiments may consider materials both in the query results and outside the query results, but may weigh them differently. Finally, some embodiments may utilize a separate collection (e.g., a reference corpus) to compute property similarities. In clustering a particular working set of properties, i.e., for a given query, the same technique is used to measure the similarity of each pair of properties. Other embodiments can use techniques that compute similarity among more than two properties at a time.

In the described exemplary embodiment, these similarity computations are used in order to assemble clusters (i.e., groups) of properties. In some embodiments, the clusters may be disjoint and in other embodiments, a property may be assigned to multiple clusters.

Several factors may influence the way in which these clusters are assembled. These include (but are not limited to): (i) number (minimum, maximum) of clusters generated; (ii) number (minimum, maximum) of properties in each cluster; and (iii) cluster coherence vs. distinctiveness (i.e., more, finer-granularity clusters vs. fewer, coarser-granularity clusters); and (iv) limiting the number of clusters to which a property may be assigned.

Subject to these or other factors, various techniques may be used to derive clusters from the similarity computations. These include (but are not limited to) the following: (i) agglomerative clustering, where each property is initially placed into its own group, and groups are successively consolidated by linking the two most similar properties in distinct groups; (ii) graph partitioning, in which the similarities between properties are used to create a graph of vertices and edges, vertices corresponding to properties and edges to pairs of properties, and a partitioning algorithm is used to minimize a function of the set of edges that connect vertices in distinct partitions; and (iii) K-means clustering, where the properties are interpreted as geometric objects, and properties are iteratively assigned to a specified number of groups so as to maximize the distance between groups and minimize the distances among properties assigned to the same group.

In certain embodiments, due to limitations placed on cluster formation or other factors, during cluster formation some of the properties identified as relevant for the query might not be included in the clusters. The foregoing descriptions have been directed to specific embodiments of the invention; other embodiments can utilize different implementations of the clustering mechanism without departing from the spirit and scope of the invention.

The property clusters alone can be used to augment the original search results in the response provided to the user in some embodiments. In the search system 230, once the clusters of properties have been formed, in step 512 the property clusters are used to identify a group of documents corresponding to each cluster. Implementation of this step will depend on how the clusters and documents are used in respective embodiments. If documents are not returned with clusters to a user, this step may be omitted. Each cluster, which is composed of one or more properties initially obtained from the database, is implicitly related to at least one document in the database based on the relationships between documents and properties in the database. The correspondence between a cluster of properties and documents in the database can be specified in a number of ways, however. For example, in one embodiment, a document can be defined to correspond to a cluster if it has at least one property in the cluster. In another embodiment, a document can be defined to correspond to a cluster if it has at least two properties in the cluster. The particular definition used to map clusters to corresponding documents should take into account a number of factors, including efficiency and improving recall. The mapping technique is another aspect of embodiments of the present invention.

While the documents corresponding to the clusters will often overlap with the original result set, the documents corresponding to the clusters will typically include some or at least one document that is not in the original result set (unless the results are restricted to the original result set). Embodiments of the present invention can use a number of mapping functions. Particular embodiments of the invention can utilize some of the following possibilities: (i) match-any: any material associated with at least one of the properties of the particular cluster is considered to be mapped to the cluster; (ii) match-all: any material associated with all of the properties of the particular cluster is considered to be mapped to the cluster; and (iii) match-partial: any material associated with minimum number of the properties of the particular cluster is considered to be mapped to the cluster. This minimum number may be specified absolutely or as a fraction of the number of properties of the cluster. Different properties may also be weighed differently, e.g., as a function of their informativeness or relevance to the cluster. Note that in these three enumerated embodiments, the mapping is done without regard to the original result set: the materials that are mapped to each cluster can belong to the original result set, or they can be outside of it. In some embodiments, the mapping could be restricted.

One technique for performing the mapping is to translate a cluster into a query form that can directly be used to identify matching results in the database. For example, a partial match strategy, such as match two properties in the cluster, could be implemented by generating a Boolean search query that combines the properties in the cluster in such a way that the results will match at least two properties in the cluster, i.e., (Property A AND Property B) OR (Property B AND Property C) OR (Property A AND Property C). The property clusters can be used, for example, to organize the original result set. If the property clusters are used to organize the original result set, then the corresponding documents in the original result set for each property cluster can be presented to the user. This is equivalent in some respects to formulating a narrowing query from each property cluster, as described below, and presenting the results.

Figure 8:
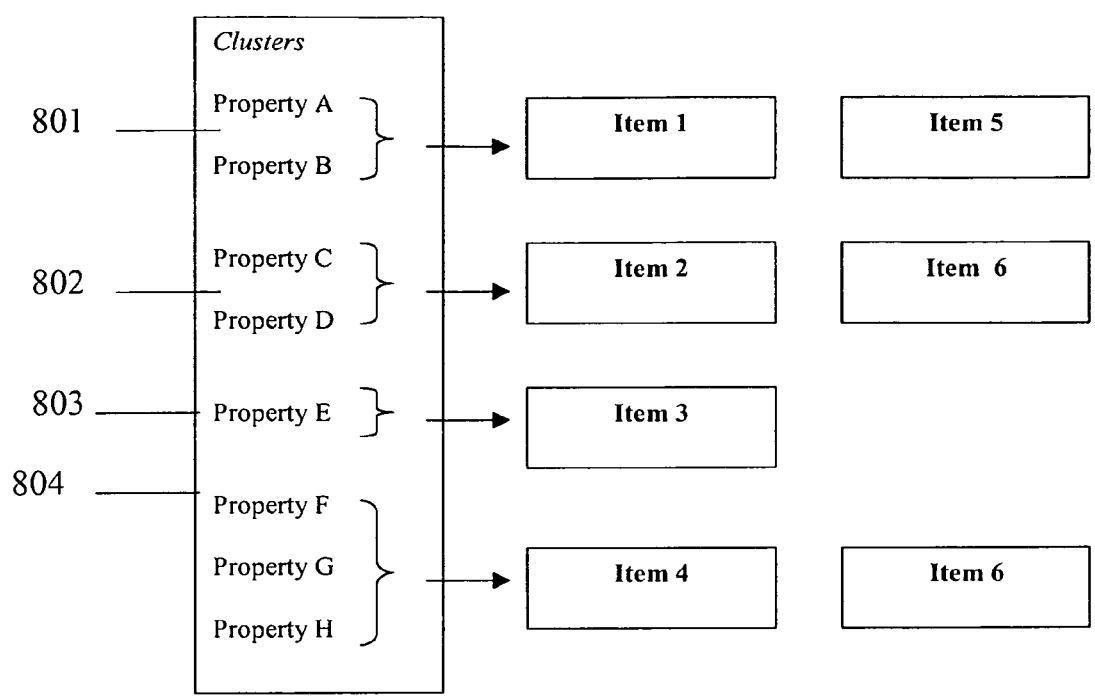
FIG. 8 is representation of the interface of FIG. 6 wherein a search has been performed in accordance with an embodiment of the invention.

FIG. 8 illustrates a clustering and mapping of clusters for the properties and materials in the database illustrated in FIG. 3. Properties A-H are divided into four clusters 801, 802, 803, 804: (801) A-B, (802) C-D, (803) E, (804) F-G-H. Each cluster is mapped to a corresponding set of materials using a mapping function wherein a document must have at least two properties in the cluster in order to correspond to the cluster. Items 1 and 5 correspond to Cluster 801. Items 2 and 6 correspond to Cluster 802. Item 3 corresponds to Cluster 803 and Item 4 and 6 correspond to Cluster 804. Item 6 corresponds to two clusters.

In certain embodiments, the properties that comprise a cluster may be associated with weights or ordering information that reflects their relative important to that cluster. For example, a cluster with properties "baseball, football, basketball" might assign a higher weight to baseball to indicate that the cluster emphasizes baseball over the other terms in the cluster, or it might assign an ordering to the properties in the cluster that implies a relative weighting (e.g., baseball is more important than football, which is in turn more important than basketball). The weighting could then be taken into account when the cluster is used to identify corresponding documents or for query modification, e.g., to create a query that reflects a weighted combination of the properties.

In some embodiments, the mapping of clusters of properties to groups of materials may be used as part of the aforementioned cluster formation step 510 in order to determine or estimate the size of the set of materials associated with each cluster. These sizes or estimates may be used as part of the algorithm for assembling clusters. If the number of materials is too low (either in absolute terms or relative to the set of materials associated with the current query), then the cluster may not have sufficient relevance to the current query. Conversely, if the number of materials is too high, the cluster may be uninteresting because it is redundant to the current query. Hence, some embodiments may constrain which clusters are produced based on applying minimum or maximum thresholds to the number of materials associated with the clusters. This number may be estimated to reduce computational overhead.

Clusters of properties can be used in various ways. In particular, one or more clusters can be displayed to the user to augment the original results for the query. A cluster can be displayed using one or more representations. In certain embodiments, a cluster may be presented in a response as a list of the properties associated with that cluster. If the properties have associated weights, those weights may be included in the presentation, or may be implied by the ordering of the properties in the presented list. In some embodiments, a cluster may be presented as only a subset of the properties associated with it, especially if the full list would be inconvenient to present. In other embodiments, a cluster may be presented using a descriptive name that might not be one of the properties associated with that cluster.

Figure 9:
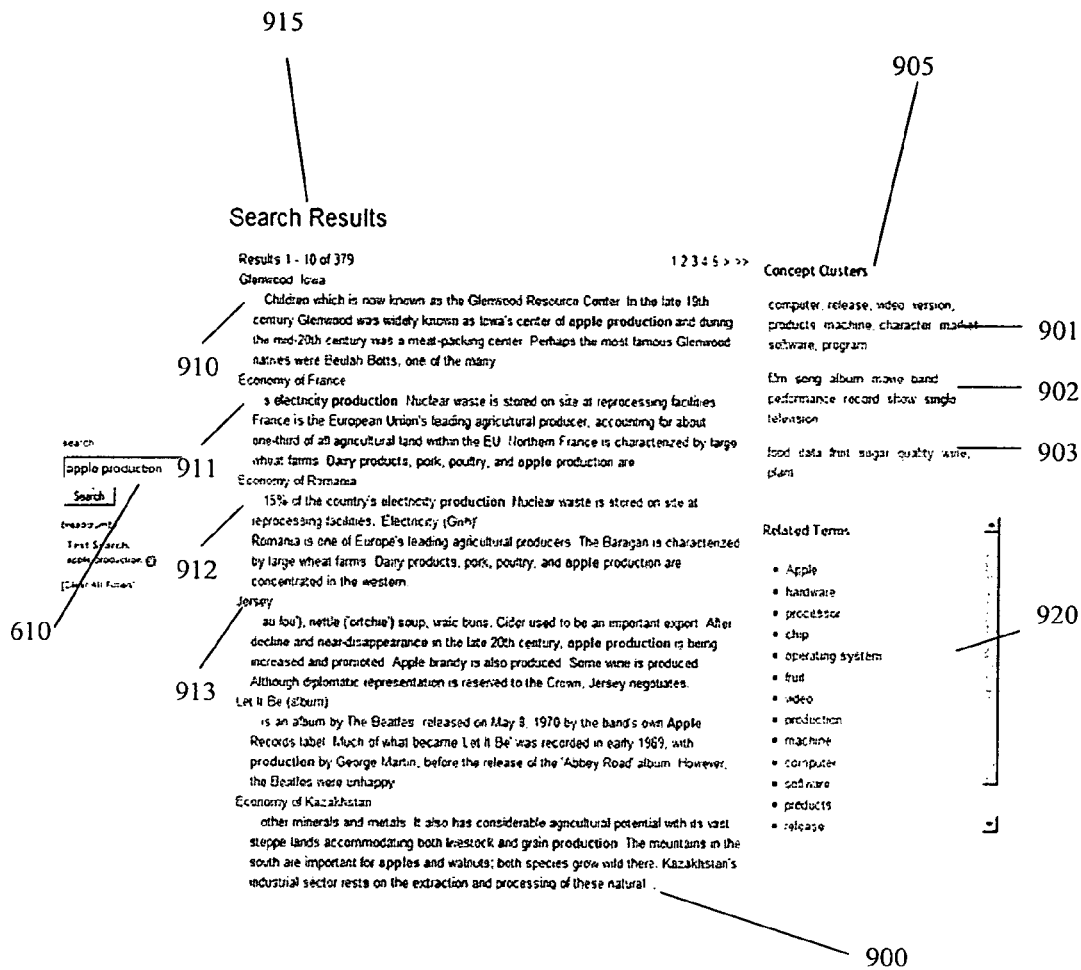
FIG. 9 is a schematic representation of a clustering and mapping process in accordance with an embodiment of the invention.

In search system 230, the clusters of properties are used to respond to the original search query. FIG. 9 shows the result of a search for "apple production" entered as a free-text query into search box 610. The illustrated records 910, 911, 912, and 913 are documents that are in the original result set 915 for the query "apple production". Although the user can optionally browse through these results, there are 379 records in the original search results. Accordingly, it is helpful to know that the results are associated with properties that fall into certain clusters. The user can infer certain topical areas from the clusters of properties. In certain embodiments, labels for the clusters can also be generated by the system. Box 920 illustrates a list of Related Terms that are associated with the documents in the original result set. The terms in box 920 include a subset of the terms associated with all of the documents in the original result set and optionally could correspond to all of the relevant properties used for clustering. The following terms have been selected from the related terms and assigned to clusters: album, band, character, market, computer, data, film, food, fruit, machine, movie, performance, plant, products, program, quality, record, release, show, single, software, song, sugar, television, version, video, and wine. These terms may be selected from the related terms, for example, based on greater relevance or significance or may be selected by default during the clustering process due to limitations on the clustering process, such as maximum number of clusters or maximum size of clusters. As shown in box 905, after the clustering step, the following three clusters 901, 902 and 903 were formed: (901) computer, release, video, version, products, machine, character, market, software, program; (902) film, song, album, movie, band, performance, record, show, single, television; and (903) food, data, fruit, sugar, quality, wine, and plant. Depending on the restrictions placed on query formation, some of the Related Terms may not appear in the concept clusters. In certain embodiments, the user can view the documents corresponding to a particular cluster by clicking on one of the three clusters 901, 902, and 903. In other embodiments, a list of corresponding documents can be displayed with each cluster. In the illustrated embodiment, the three clusters 901, 902 and 903 can be used to trigger new queries refining the original query. Query refinement using clusters in accordance with embodiments of the invention is discussed further below.

Figure 10:
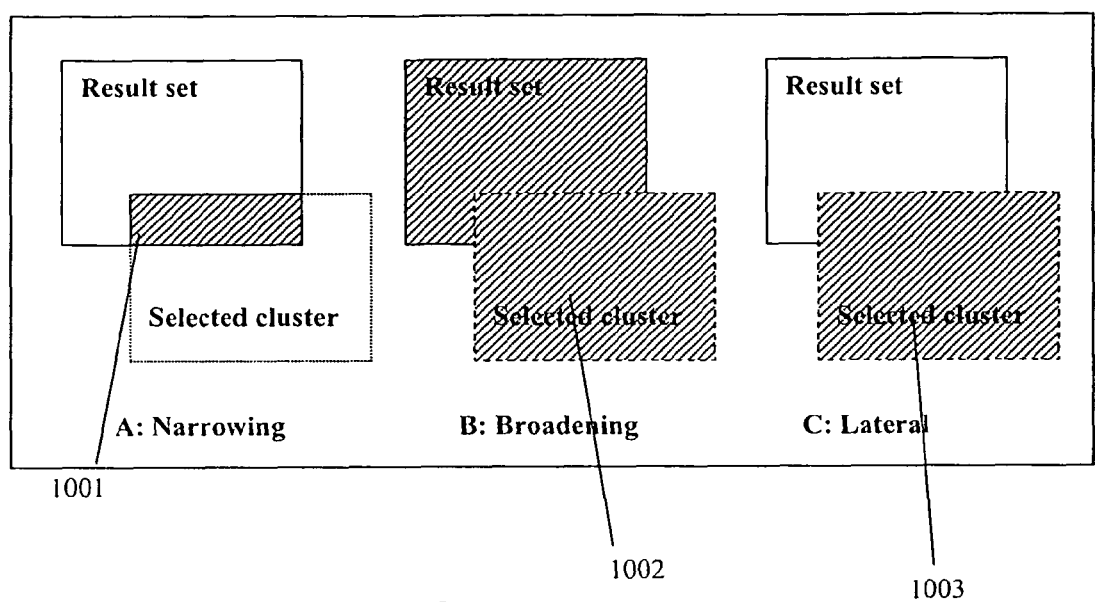
FIG. 10 is a schematic representation of certain options for query modification in accordance with an embodiment of the invention.

In another aspect, in certain embodiments, property clusters can also be used for query refinement. The clusters of properties are derived from and are therefore relevant to the original query. A user can iterate on the original search query using information provided by the clustering process. A cluster of properties as described herein can readily be translated to a typical user query-like form or search expression. Thus, a cluster of properties can be readily adapted for use in refining the original query. For example, the properties in a cluster can be combined using Boolean operators. A cluster of properties can be translated into a query form in accordance with a desired mapping function, such as a partial match mapping function. In preferred embodiments, a cluster of properties can be automatically formatted so that the query formed from the cluster would retrieve items according to the mapping function. In certain embodiments of the present invention, clusters of properties are used to provide iterative searching by modifying the original query using one or more clusters of properties. In preferred embodiments, to obtain a modified query, a (partial) query formed by translating a cluster of properties into a query according to a given mapping function is combined with or used to replace the original query. One of skill in the art will appreciate that the technique for identifying documents corresponding to a particular cluster is a special case of translating a cluster to a query, in accordance with a given mapping function, and executing the query generated from the cluster. The mapping function is typically a limitation of the system and transparent to the user. However, in certain embodiments, the user could specify the function for translating a cluster to a query. In various embodiments, the user can specify the desired cluster and optionally the method for combining the desired cluster with the original query. The method for combining the desired cluster with the original query may also be a limitation of the system. Three particular techniques for modifying the original query are narrowing, broadening, and lateral modification of the original query based on the set of properties associated with one (selected) cluster, which are conceptually illustrated in FIG. 10, wherein only the materials indicated in shading are returned to the user: (i) Narrowing: Modifying the query to return the intersection of the original result set and the material set mapped to the selected cluster. Example: search "java" AND cluster "coffee, beverage, brew, coffeehouse, roast"; (ii) Broadening: Modifying the query to return the union of the original result set and the material set mapped to the selected cluster. Example: search "car" OR cluster "auto, vehicle"; and (iii) Lateral Modification: Modifying the query to return the material set mapped to the selected cluster, discarding the original result set. Example: search "government"→cluster "taxes, income, property, IRS". For example, clicking on a cluster to view the corresponding documents can be considered a lateral modification of the query.

A query or a cluster can be viewed as the query or cluster itself, or in terms of the documents in the respective result set or set of corresponding items. The modified query can be viewed in terms of an expression generated from the original query and one or more clusters or in terms of operations on the respective document sets, e.g., union, or intersection. Accordingly, in addition to formulating a modified query and processing it as the original query, if the matching items have already been identified, e.g., if step 512 has been performed, processing of the modified query can be initiated by merely identifying the desired group of documents rather than searching against the database again. Also, the modified query can be executed by executing the cluster portion of the query against the database and merging it with the original result set.

Figure 11:
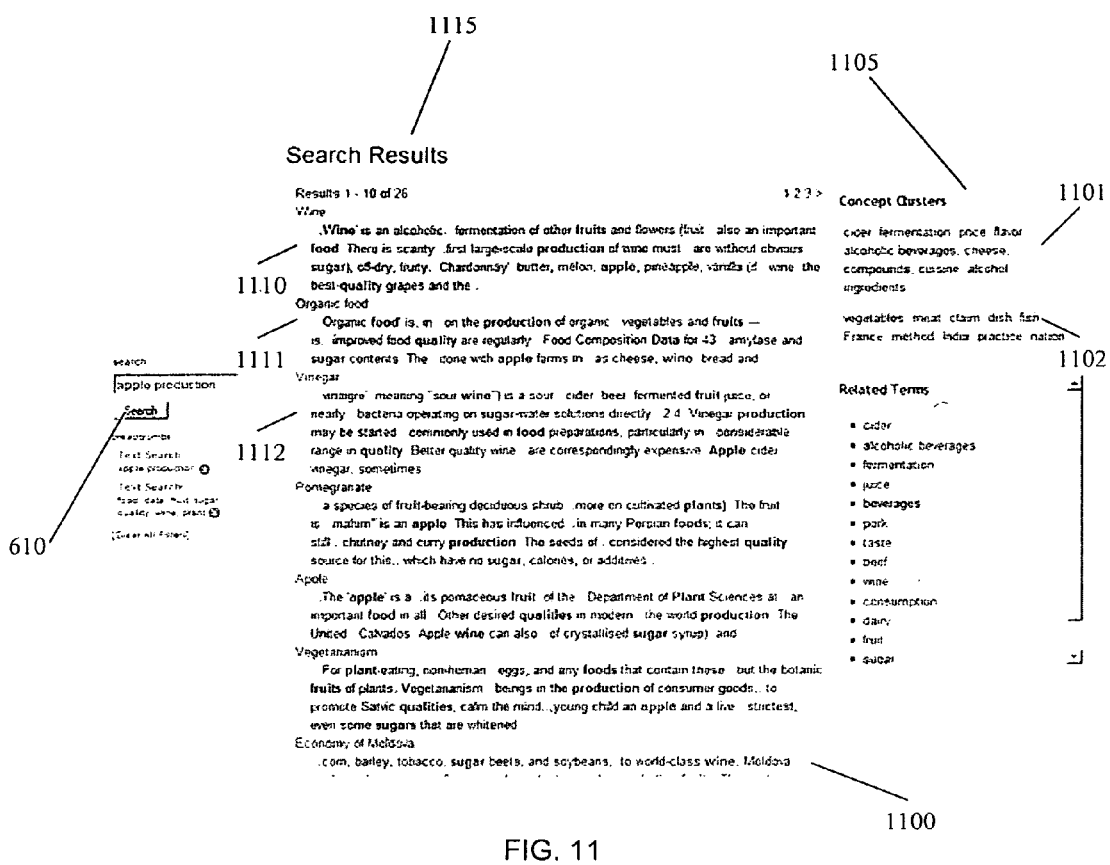
FIG. 11 is a representation of the interface of FIG. 6 wherein a query has been modified in accordance with an embodiment of the invention.

In certain embodiments, the modified query can be used to initiate the process again. The documents indicated by the modified query are used as the original result set of documents as a starting point for the clustering process. In search system 230, steps 502, 504, and 506 can be partially or wholly omitted in processing the modified query when the documents have previously been retrieved. FIG. 11 illustrates the outcome 1100 of selecting the Cluster 903 to modify the original search. The new query is a translation of "apple production" AND cluster "food, data, fruit, sugar, quality, wine, plant", wherein the cluster is translated using a match two mapping function. The mapping function is not visible to the user. The listed documents 1110, 1111, 1112 in the search results 1115 are the results of the modified query. These documents are used to generate the relevant properties that are then clustered. New clusters 1101 and 1102 are provided. Although fewer clusters are generated relative to results 900, this will not necessarily be true in successive iterations. The process can be iterated again until search results satisfactory to the user are reached. By seeing properties associated with the search results organized into clusters, users can identify a subset of results that best matches their needs. In some embodiments, a different method, not employing the clustering technique described herein, could be used for executing a subsequent iteration of a query.

The methods and systems described herein enable generation of higher quality clusters. Some measures of cluster quality are coherence (i.e., materials in the same cluster are similar to one another) and distinctiveness (i.e., materials in a different cluster are different from one another). While known clustering methods generally strive to produce clusters that are coherent and distinctive, in certain embodiments, the property-based method of the present invention is generally more successful than the methods (especially document-based clustering) of existing approaches. Another advantage of clustering in accordance with embodiments of the present invention is that the clusters form a basis for progressive query refinement. Because a cluster comprises a set of properties, it can be composed with the query that gave rise to the cluster to generate a modified version of that query. Progressive query refinement promotes a dialog between the user and the information access system that guides the user's process of achieving information seeking goals. As discussed earlier, existing approaches are not fully suitable for query refinement. Another advantage in embodiments of the present invention is that the technique for producing clusters has a representation and an interpretation that can be understood by a human user. The set of properties that describes a cluster is a concise description of the cluster, and the properties are preferably selected from a vocabulary that is familiar to the users of the information access system. In contrast, existing approaches generally depend on representations (e.g., vector spaces) that are not meaningful to users. A user can readily infer which cluster is likely to lead to more relevant search results. A user can also infer from the clusters information about the topics of materials in the database and properties or terms that can be useful for searching the database based on the original query. Especially in a selection-based or directory interface, the clustering of properties can also provide a way to generate combinations of documents that would not otherwise be retrieved.

The foregoing description has been directed to specific embodiments of the invention. The invention may be embodied in other specific forms without departing from the spirit and scope of the invention.

We claim:

1. A non-transitory computer readable medium having instructions stored thereon that cause a processor to retrieve documents in response to at least one search term from a user, the retrieving the documents comprising:

receiving the search term for searching a plurality of text documents, wherein each text document is associated with one or more salient terms extracted from the document and each text document is associated with one or more properties that represent the one or more extracted salient terms;

retrieving a first set of retrieved documents from a query of the plurality of text documents, wherein each of the retrieved documents comprises the search term;

retrieving the associated salient terms for each of the retrieved documents and the associated properties;

grouping based on a distance metric the retrieved salient terms into one or more clusters of salient terms and providing the clusters of salient terms to the user, wherein each of the cluster of salient terms corresponds to one of the properties associated with the retrieved documents and each cluster displays the associated salient terms;

receiving a selection of a first cluster of the clusters of salient terms from the user, wherein the first cluster comprises first salient terms;

selecting a second set of retrieved documents from the first set of retrieved documents, wherein each second set document of the second set includes at least one of the first salient terms of the first cluster of salient terms;

retrieving associated second salient terms for each of the second set documents; and grouping the second salient terms into one or more second clusters of salient terms and providing the second clusters of salient terms to the user.

2. The non-transitory computer readable medium of claim 1, wherein each second set document includes two or more of the first salient terms of the first cluster.

3. The non-transitory computer readable medium of claim 1, the retrieving the documents further comprising:

receiving a selection of a second cluster from one of the second clusters from the user, wherein the second cluster comprises second salient terms; and selecting a third set of retrieved documents from the second set of retrieved documents, wherein each third set document includes at least one of the second salient terms of the second cluster.

4. The non-transitory computer readable medium of claim 1, wherein each of the clusters provided to the user corresponds to a synonym of the search term.

5. The non-transitory computer readable medium of claim 1, the retrieving the documents further comprising, after selecting the second set of retrieved documents, iteratively repeating the retrieving the associated salient terms, grouping the retrieved salient terms into one or more clusters of salient terms, receiving the selection of a first cluster, and selecting a second set of retrieved documents in response to additional selections of a cluster by the user.

6. The non-transitory computer readable medium of claim 1, wherein the providing the clusters to the user comprises displaying on a user interface for each cluster provided to the user one or more salient terms for the cluster.

7. The non-transitory computer readable medium of claim 6, wherein a selection of one of the displayed clusters causes a corresponding set of documents to be displayed on the user interface.

8. The non-transitory computer readable medium of claim 6, further displaying on the user interface a list of related terms associated with the first set of retrieved documents.

9. The non-transitory computer readable medium of claim 6, wherein a selection of one of the displayed clusters triggers a new query based on one or more of corresponding terms of the displayed cluster.

10. The non-transitory computer readable medium of claim 1, the retrieving the documents further comprising mapping each of the first set of retrieved documents to at least one of the clusters provided to the user.

11. The non-transitory computer readable medium of claim 10, wherein the mapping comprises at least one of: match-any, match-all, or match-partial.

12. A computer implemented method for retrieving text documents, the method comprising:

receiving at least one search term for searching a plurality of text documents, wherein each text document is associated with one or more salient terms extracted from the document and each text document is associated with one or more properties that represent the one or more extracted salient terms;

retrieving a first set of retrieved documents from a query of the plurality of text documents, wherein each of the retrieved documents comprises the search term;

retrieving the associated salient terms for each of the retrieved documents and the associated properties;

grouping based on a distance metric the retrieved salient terms into one or more clusters of salient terms and providing the clusters of salient terms to the user, wherein each of the cluster of salient terms corresponds to one of the properties associated with the retrieved documents and each cluster displays the associated salient terms;

receiving a selection of a first cluster of the clusters of salient terms from the user, wherein the first cluster comprises first salient terms;

selecting a second set of retrieved documents from the first set of retrieved documents, wherein each second set document of the second set includes at least one of the first salient terms of the first cluster of salient terms;

retrieving associated second salient terms for each of the second set documents; and grouping the second salient terms into one or more second clusters of salient terms and providing the second clusters of salient terms to the user.

13. The method of claim 12, wherein each second set document includes two or more of the first salient terms of the first cluster.

14. The method of claim 12, the method further comprising:

receiving a selection of a second cluster from one of the second clusters from the user, wherein the second cluster comprises second salient terms; and selecting a third set of retrieved documents from the second set of retrieved documents, wherein each third set document includes at least one of the second salient terms of the second cluster.

15. The method of claim 12, wherein each of the clusters provided to the user corresponds to a synonym of the search term.

16. The method of claim 12, the method further comprising, after selecting the second set of retrieved documents, iteratively repeating the retrieving the associated salient terms, grouping the retrieved salient terms into one or more clusters of salient terms, receiving the selection of a first cluster, and selecting a second set of retrieved documents in response to additional selections of a cluster by the user.

17. The method of claim 12, wherein the providing the clusters to the user comprises displaying on a user interface for each cluster provided to the user one or more salient terms for the cluster.

18. The method of claim 17, wherein a selection of one of the displayed clusters causes a corresponding set of documents to be displayed on the user interface.

19. The method of claim 17, further displaying on the user interface a list of related terms associated with the first set of retrieved documents.

20. The method of claim 17, wherein a selection of one of the displayed clusters triggers a new query based on one or more of corresponding terms of the displayed cluster.

21. The method of claim 12, the method further comprising mapping each of the first set of retrieved documents to at least one of the clusters provided to the user.

22. The method of claim 21, wherein the mapping comprises at least one of: match-any, match-all, or match-partial.

23. An information retrieval system comprising:
a processor coupled to a computer readable medium having instructions stored thereon, wherein the processor executing the instructions implements modules comprising:
an interface module that receives at least one search term and searches a plurality of text documents, wherein each text document is associated with one or more salient terms extracted from the document and each text document is associated with one or more properties that represent the one or more extracted salient terms;
a database access module that retrieve a first set of retrieved documents from a query of the plurality of text documents, wherein each of the retrieved documents comprises the search term;
a matching module that retrieves the associated salient terms for each of the retrieved documents and the associated properties;
a clustering module that groups based on a distance metric the retrieved salient terms into one or more clusters of salient terms and provides the clusters of salient terms to the user, wherein each of the cluster of salient terms corresponds to one of the properties associated with the retrieved documents and each cluster displays the associated salient terms;
the interface module that receives a selection of a first cluster of the clusters of salient terms from the user, wherein the first cluster comprises first salient terms;
the matching module selecting a second set of retrieved documents from the first set of retrieved documents, wherein each second set document of the second set includes at least one of the first salient terms of the first cluster of salient terms;
further comprising retrieving associated second salient terms for each of the second set documents; and
grouping the second salient terms into one or more second clusters of salient terms and providing the second clusters of salient terms to the user.

24. The system of claim 23, wherein each second set document includes two or more of the first salient terms of the first cluster.

25. The system of claim 23, further comprising:
receiving a selection of a second cluster from one of the second clusters from the user, wherein the second cluster comprises second salient terms; and
selecting a third set of retrieved documents from the second set of retrieved documents, wherein each third set document includes at least one of the second salient terms of the second cluster.

26. The system of claim 23, wherein each of the clusters corresponds to a synonym of the search term.

27. The system of claim 23, further comprising, after selecting the second set of retrieved documents, iteratively repeating the retrieving the associated salient terms, grouping the retrieved salient terms into one or more clusters of salient terms, receiving the selection of a first cluster, and selecting a second set of retrieved documents in response to additional selections of a cluster by the user.

28. The system of claim 23, wherein the providing the clusters to the user comprises displaying on a user interface for each cluster provided to the user one or more salient terms for the cluster.

29. The system of claim 23, wherein a selection of one of the displayed clusters causes a corresponding set of documents to be displayed on the user interface.

30. The system of claim 28, further displaying on the user interface a list of related terms associated with the first set of retrieved documents.

31. The system of claim 23, wherein a selection of one of the displayed clusters triggers a new query based on one or more of corresponding terms of the displayed cluster.

32. The system of claim 23, further comprising mapping each of the first set of retrieved documents to at least one of the clusters provided to the user.

33. The system of claim 32, wherein the mapping comprises at least one of: match-any, match-all, or match-partial.

* * * * *